United States Patent

[11] 3,582,938

[72] Inventors Robert Hoffman
Park Ridge;
Fritz Keiser, Des Plaines, both of, Ill.
[21] Appl. No. 655,131
[22] Filed July 21, 1967
[45] Patented June 1, 1971
[73] Assignee SCM Corporation
New York, N.Y.

[54] ELECTROMECHANICAL DATA PROCESSING TERMINAL
24 Claims, 38 Drawing Figs.

[52] U.S. Cl. .......... 340/347
[51] Int. Cl. .......... H03k 13/24
[50] Field of Search .......... 235/59; 340/347, 357; 197/16; 235/61.65, 144, 60.3, 60.39, 60.4, 144

[56] References Cited

UNITED STATES PATENTS

| | | | |
|---|---|---|---|
| 3,022,939 | 2/1962 | Flagge .......... | 235/59 |
| 3,200,927 | 8/1965 | Ryan .......... | 340/347 |

*Primary Examiner*—Maynard R. Wilbur
*Assistant Examiner*—Charles D. Miller
*Attorney*—Pennie, Edmonds, Morton, Taylor and Adams

ABSTRACT: A compact electromechanical device, which is suitable as a terminal or remote station for data processing equipment such as an electronic computer, can be used (1) as an input unit for encoding and transmitting numerical values or other forms of information into the data process equipment for use in computations or other types of known data processing operation, and (2) as an output unit for decoding the output from the data process equipment and printing the thus decoded information in the form of decimal data or other forms of information.

The device comprises three sections: an input or keyboard-encoding section, a decoding section, and a printout section. The input section comprises a plurality of keys arranged in two rectangular arrays, one array of keys serving as decimal data entry keys and the other serving as function entry keys. The keys are connected to an encoder which upon depression of the keys sequentially encodes the data inputs into combinations of binary coded electrical signals and encodes the function inputs to different combinations of binary coded electrical signals which instruct the data processing equipment or the decoding section of the device to perform predetermined functions. The decoding section sequentially decodes the binary coded electrical signals to decimal output and stores serially, in the same sequential order, the thus decoded information in a register. Thereafter, a transfer mechanism is actuated to transfer simultaneously the contents of the register to an ordinal series of printing elements. The printout section is then actuated to print out the information stored in the print elements on a record material.

INVENTORS
ROBERT HOFFMAN
FRITZ KEISER
BY
Pennie, Edmonds, Morton, Taylor and Adams
ATTORNEYS

PATENTED JUN 1 1971 3,582,938

SHEET 02 OF 24

INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams.
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS

INVENTORS
ROBERT HOFFMAN
FRITZ KEISER

BY
Pennie, Edmonds, Morton, Taylor & Adams
ATTORNEYS

INVENTORS
ROBERT HOFFMAN
FRITZ KEISER

BY
Pennie, Edmonds, Morton, Taylor and Adams
ATTORNEYS

INVENTORS
ROBERT HOFFMAN
FRITZ KEISER

BY

Pennie, Edmonds, Morton, Taylor and Adams

ATTORNEYS

INVENTORS
ROBERT HOFFMAN
FRITZ KEISER

BY
Pennie, Edmonds, Morton, Taylor and Adams.
ATTORNEYS

INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams.
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams.
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams.
ATTORNEYS INVENTORS
ROBERT HOFFMAN
FRITZ KEISER
BY
Pennie, Edmonds, Morton, Taylor and Adams.
ATTORNEYS INVENTORS
ROBERT HOFFMAN
FRITZ KEISER
BY
Pennie, Edmonds, Morton, Taylor and Adams
ATTORNEYS INVENTORS
ROBERT HOFFMAN
FRITZ KEISER
BY
Pennie, Edmonds, Morton, Taylor and Adams
ATTORNEYS

ELECTROMECHANICAL DATA PROCESSING TERMINAL

BACKGROUND OF THE INVENTION

I. Field of the Invention

This invention relates to peripheral data processing equipment and, more particularly, to an electromechanical data processing terminal which can be used as an input/output device in association with data processing equipment such as an electronic computer to perform numerical computations and other data processing operations. Although, the apparatus of this invention is primarily useful as a peripheral data processing device, it is understood that the apparatus can be constructed with internal electronic computing and data processing circuits to form a self-sufficient unit capable of performing numerical computations and other functions. The particular electronic computing circuits and data processing equipment however, are not a part of this invention.

II. Description of the Prior Art

The utility of conventional electromechanical calculators is limited to performance of simple mathematical calculations. For more complicated numerical computations sophisticated electronic equipment, such as electronic calculators and computers, is generally used. The cost for the electronic equipment, however, is high even for small "desk-top" electronic calculators. Moreover, most electronic calculators, particularly the "desk-top" models, do not print out the digit data; instead, display panels are used. Failure to provide a more permanent record of the numerical computations makes electronic calculators of this type unsuitable for many applications because it may induce human errors.

Peripheral equipment, including a keyboard-encoder and apparatus for decoding and printing digital data, has been used in combination with data processing equipment. Heretofore, peripheral equipment of this type involved complicated mechanism and was expensive to make. Generally, they have not been used in association with data processing equipment such as calculators and computers but have been provided with internal calculating capacity.

SUMMARY OF THE INVENTION

The present invention provides a compact electromechanical data processing terminal which is suitable for use in combination with data processing equipment and is usable in a manner similar to a desk calculator but capable of handling vastly more complicated mathematical computations. Broadly stated, the terminal comprises an input section, a decoding section, and a printout section. The input section has first means which preferably is in the form of a plurality of keys movable for entering sequentially into the terminal a set of information containing at least one unit of information in a first predetermined code form, second means serving as an encoder for cooperating in combination with the keys for encoding, in the same sequential order, the set of information into a corresponding set of electrical signals in a second predetermined code form manipulatable by the data processing equipment.

The decoding section is operable upon receiving electrical signals in the second predetermined code form initiated from the input section. The decoding section has a plurality of decoding elements connected cooperatively to receive electrical signals in the second predetermined code form and responsive thereto to generate a set of output information in the first code form corresponding to and in the same sequential order as the electrical signals. It also includes a register which has a plurality of storage elements each engaged to receive sequentially one unit of the set of output information from the decoding elements.

The printout section comprises a set of printing elements in the first code form each corresponding to, and capable of receiving the information in one of, said storage elements of the register. There is a transfer mechanism, actuable after the storage elements have completed the receipt of the set of output information from the decoding elements, for transferring simultaneously the contents of the register to the corresponding printing elements, thereby selecting the printing elements corresponding to the set of output information for a printing operation. A record material is disposed in printing relationship with the printing elements. During each printing operation a printing actuator causes the printing elements to printout their contents on the record material.

Preferably, a group of the keys in the input section is arranged as data keys to cooperate in combination with the encoder for converting decimal information to binary coded electrical signals, and a number of the keys in the input section is used as function keys to provide function instructions to the data processing equipment and the decoding section. The function keys are arranged cooperatively with the encoder for converting the function instructions to binary coded electrical signals which signals are different from the signals representing the input data.

The decoding and the printout sections may also be used in combination as an output device for the data processing equipment. For such application, the decoding section is connected for receiving the coded electrical signals from the data processing equipment and sequentially decodes the signals, entering the thus decoded information successively into a register. Thereafter, a transfer mechanism is actuated for transferring simultaneously the contents of the register to a set of printing elements for the printing operation as described hereinabove. Advantageously, the decoding and the printout operations are controlled and motivated by a set of gear trains arranged for selectively driving the decoding and printout sections in accordance with a predetermined time sequence whereby the decoding operation for each set of information can be carried out concurrently with the printing out of the preceding set of decoded information.

The data processing terminal of this invention can be manufactured at relative low cost and has many applications in addition to its utilization as a desk calculator and as an output device for data processing equipment, as mentioned hereinabove. The applications include, for example, its use as an inquiry station for transmitting coded information to a central data processing station and for receiving coded information therefrom. Other applications of this apparatus will be apparent to those skilled in the art from the following detailed description of the preferred embodiments of the invention, described with reference to the accompanying drawings:

DESCRIPTION OF THE PREFERRED EMBODIMENTS

Contents

1. General Description
2. Input (Keyboard-Encoder) Section
3. Decoding Section
4. Transfer Mechanism
   a. Register Gear Bank Reset
   b. Register Carriage Return
   c. Print Wheel Reset
5. Printout Section
   a. Ribbon and Ribbon Advance Mechanism
   b. Printing Mechanism
   c. Paper Feed
6. Main Shaft Cycle Timing
7. Timing and Control Signal Generation

1. General Description

Figure 1:
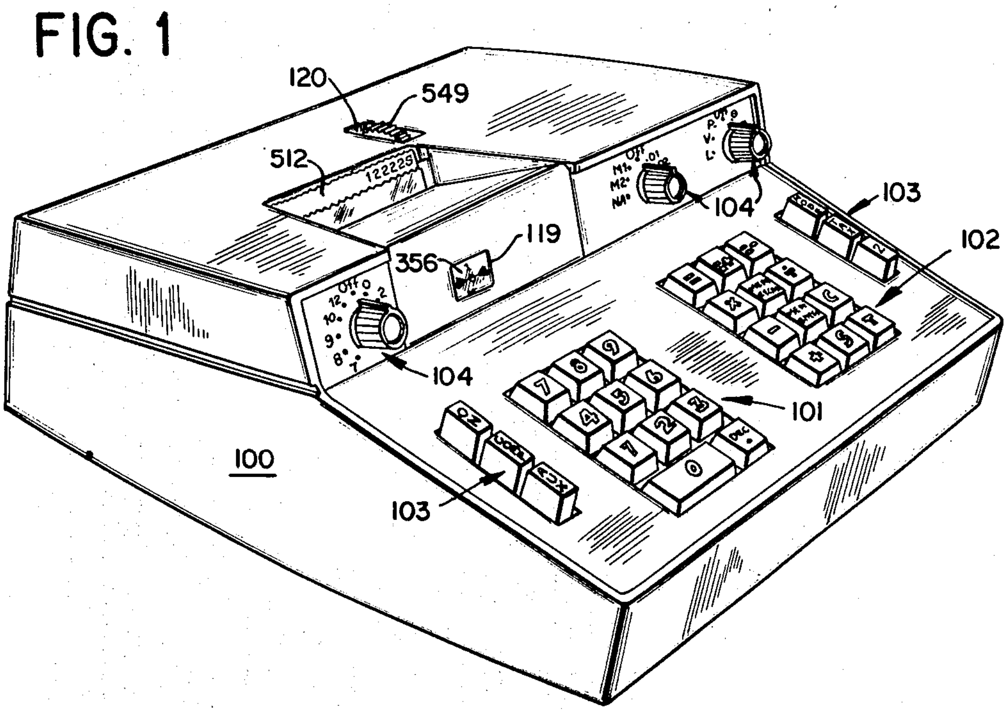
FIG. 1 is an external perspective view of an electromechanical data processing terminal, complete with case, embodying the present invention and taken from the upper left front.

The electromechanical data processing terminal constructed according to the invention is shown in FIG. 1. It includes a case 100 through which protrude a data keyboard 101, a function keyboard 102, general keyboard controls 103, and various other controls indicated generally as 104. The unit, as mentioned hereinabove, may be connected to external data processing equipment such as electronic computer or may be wholly self-contained, in which case a binary computer, for example, may be mounted within the case 100. Data processing equipment in this context is any computing, storage, or similar unit capable of communicating with the data processing terminal of this invention. Such data processing equipment, being not a part of the present invention, is not described herein.

The terminal as shown in FIGS. 2 through 6 can be considered to have three cooperative sections. The input section 200 is a keyboard-encoder, the function of which is to encode decimal digits entered by the depression of data keys in keyboard 101 as well as function symbols entered by the depression of function keys in keyboard 102 into binary coded electrical signals. The decoding section 300 has a decoder and a register, the functions of which are to decode serial binary coded electrical signals into decimal output and to store the thus decoded information sequentially in the register. The printout section 500 has an ordinal set of printing elements which can be set to correspond with the decoded information simultaneously transferring the contents of the register to the printing elements which are then used for printing out on a record material, such as a sheet of paper, the decimal digital data.

The device operates generally in the following manner. A decimal number which may have one or more digits is entered by successively depressing the digit keys from higher to lower order of the decimal number. The depression of the digit key actuates the encoder which simultaneously encodes each decimal digit into a set of binary coded electrical signals representing the decimal digit. The coded signals may be sent first to the data processing equipment or they may be sent directly to the decoding section depending on a number of factors, as will be described hereinbelow.

As each decimal digit of the input number is encoded, the binary electrical signals either from the encoder of from the data processing equipment are decoded successively by a plurality of decoding elements to generate an output corresponding to binary coded electrical signals representing the decimal digits, and the thus decoded information is then stored successively in a register. When the number is completely decoded and registered, a transfer mechanism is actuated which transfers parallelly and simultaneously the contents of the register to a set of printing elements, thereby selecting the printing elements corresponding to the decimal number for a printing operation. Thereafter, a printing roller, which is mounted on a shaft to provide reciprocating pivotal movement, is used to align a record material in printing engagement with the printing elements and to apply a rolling pressure thereon for providing a decimal digital data printout.

Motor power for the decoding and printout sections is provided by electric motor 105 which drives a shaft 106. By belt drive arrangements (FIGS. 2, 4 and 6), shaft 106 drives pulleys 106A and 106B through belts 107 and 108. Pulley 106B which rotates about shaft 109, in turn, synchronously drives shaft 110 by meshed gears 111 and 112. Shafts 109 and 110, which are continuously driven by shaft 106, are connected, respectively, to the main and decoder shafts by spring clutches. The clutches, controlled and actuated by electromagnets 114 and 115 (FIGS. 4 and 14) allow shafts 109 and 110 to drive, respectively, the main and decoder shafts intermittently. The operation of the main and decoder shafts will be discussed in greater detail later when the operations of the decoder and printout sections are described.

The three sections of the terminal, including the transfer mechanism, as well as the motor and the drive system, are mounted on a frame which comprises three parallel frame members 116, 117 and 118 (FIGS. 2 and 6) extending substantially the full length of the apparatus. The input section 200 and the printout section 500 are mounted on the two end portions of said frame with the decoding section 300 disposed therebetween.

2. Input (Keyboard-Encoder) Section

As briefly described hereinabove, the input section 200 (FIGS. 7 to 13) is used to receive decimal numbers in sequence with the higher digit first by successively depressing digit or data keys in keyboard 101, to receive function instructions by depressing function keys in keyboard 102, and to actuate the encoder for simultaneously generating different combinations of binary coded electrical signals corresponding to the decimal digits or instruction code entered.

Broadly stated, the encoder comprises a plurality of binary channels, a selected combination of which generates the binary coded electrical signals. There is a plurality of switches, each of which controls one of the binary channels and is reciprocable between two alternating positions representing the two binary digits. A set of bails is provided each actuating one of the switches and being reciprocable between first and second positions corresponding to the two alternating positions of the switch actuable by the bail. The bails are actuated by a set of parallelly arranged key stems. Each key stem is connected to and reciprocably movable by one of the keys. Each key stem has at least one actuator thereon positioned in relation to the set of bails to actuate, upon reciprocable movement of the stem, one or more bails to their first or second positions according two a predetermined code corresponding to the key connected thereto.

Figure 2:
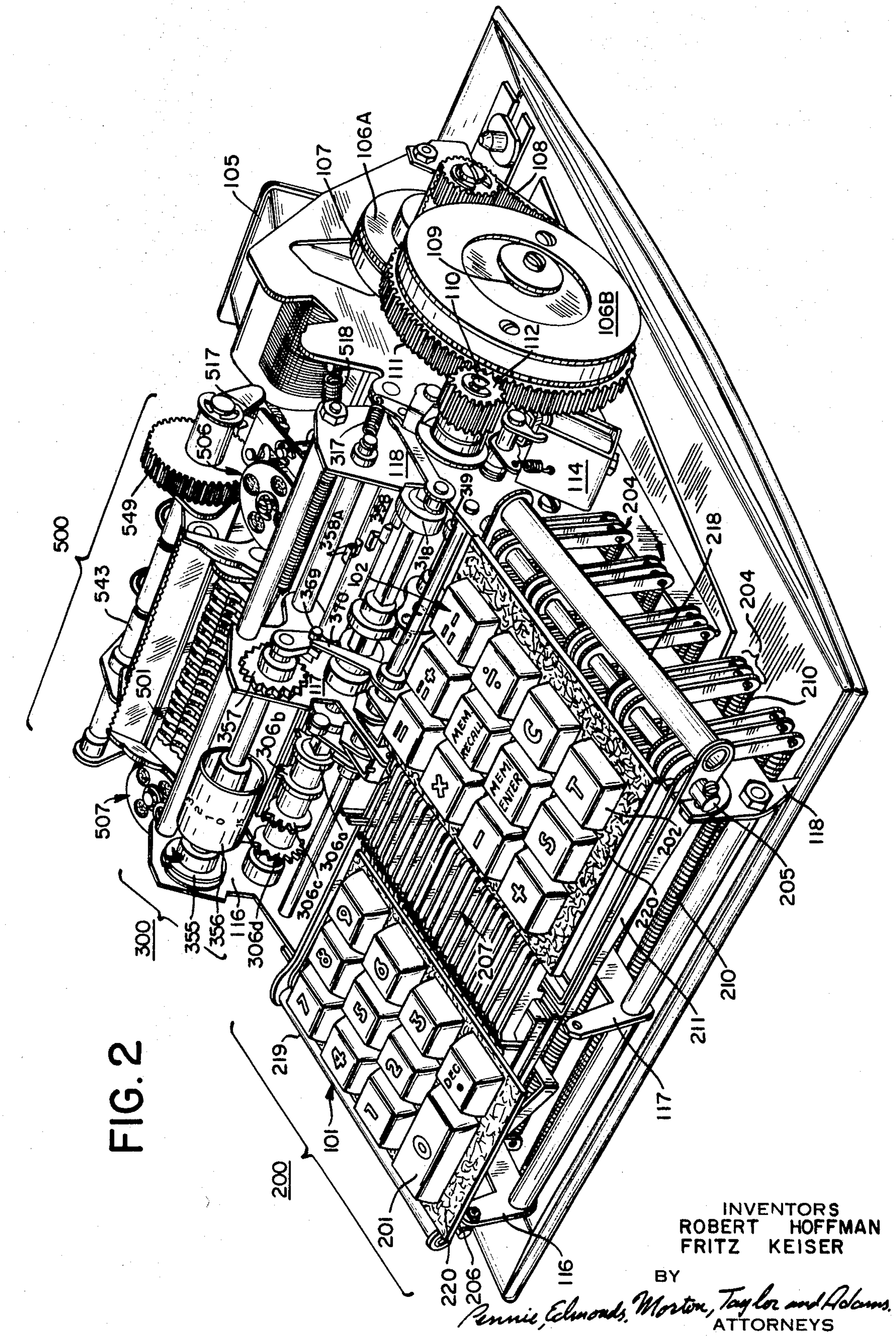
FIG. 2 is a perspective view of the terminal with its cover removed, taken from the upper right front, showing part of the three sections of the terminal, drive system, and clutch control.
Figure 3:
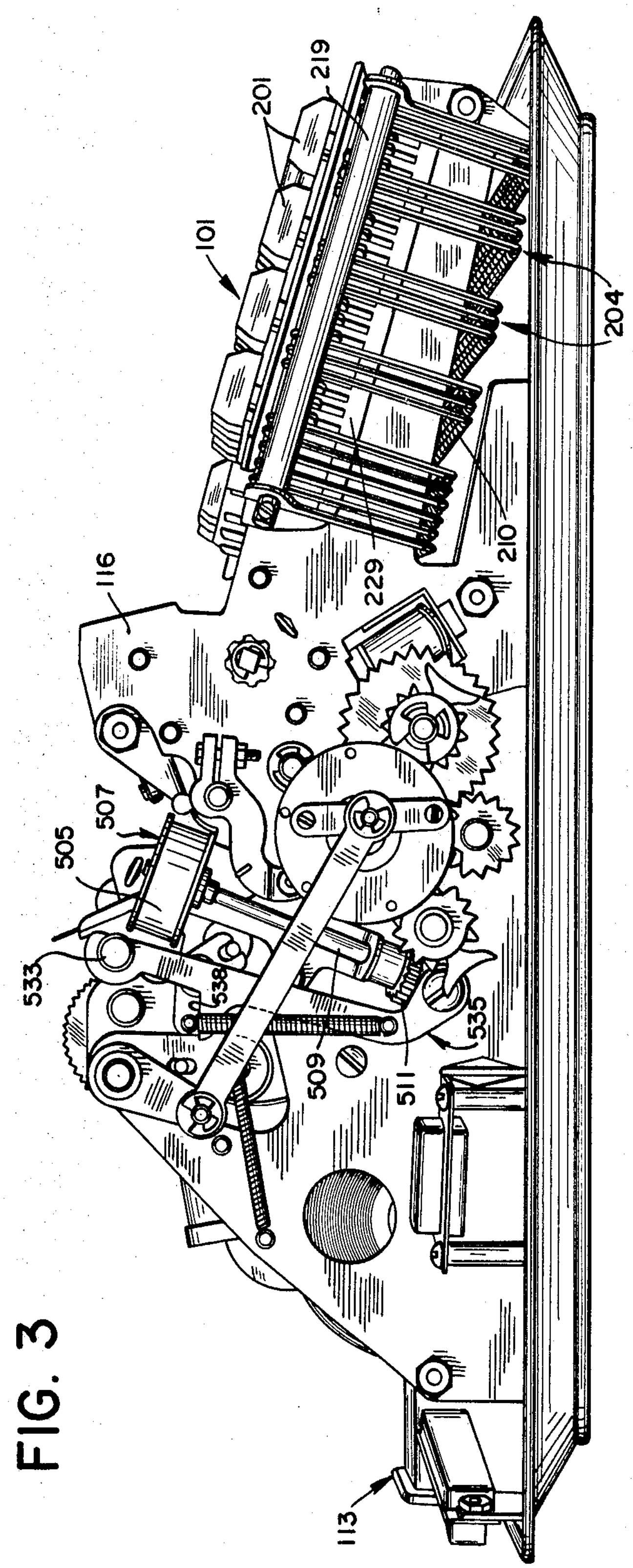
FIG. 3 is a left end perspective view of the terminal showing part of the drive for the printout section.
Figure 4:
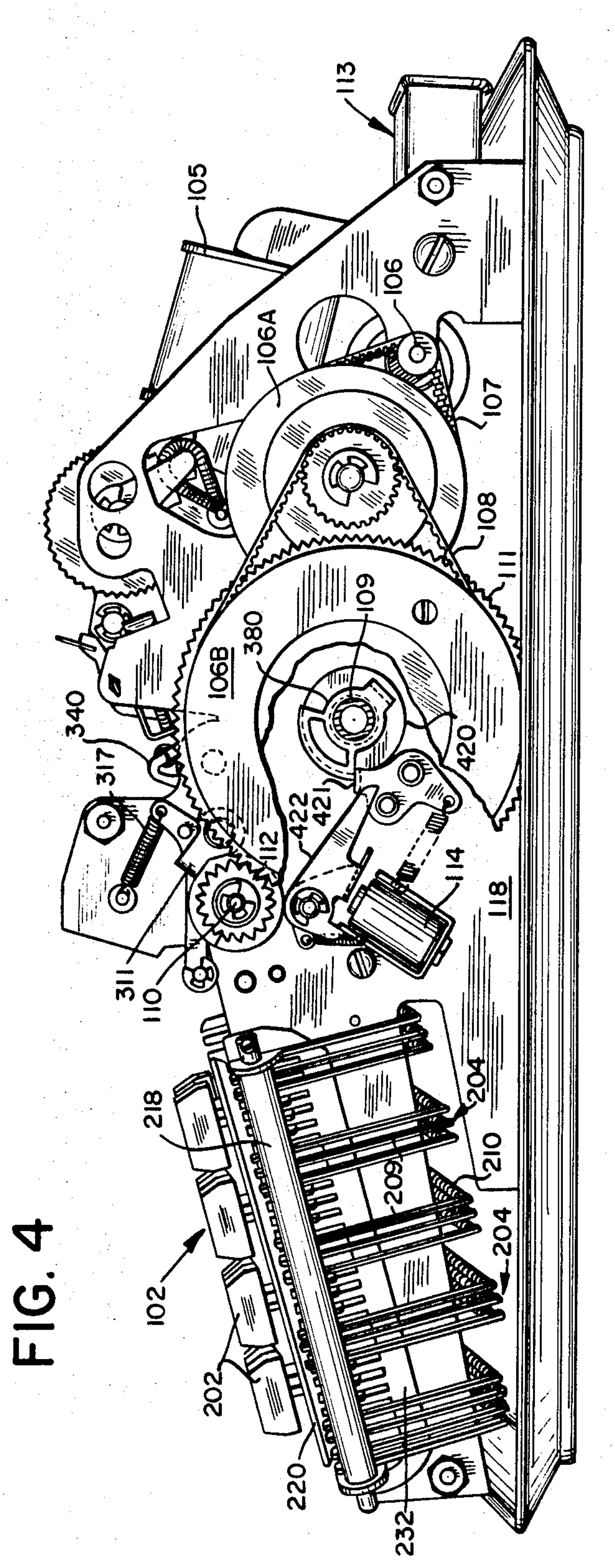
FIG. 4 is a right end perspective view of the terminal partly broken away exposing the electromagnet for controlling the clutch and the main shaft.

Preferably, the decimal digit keys 201 and the function keys 202 are arranged to form two rectangular arrays of key serving, respectively, as digital keyboard 101 and function keyboard 102 (FIGS. 1 and 2). The digital keyboard 101 has 11 keys arranged in four horizontal rows of three each except the first row which has only two keys. One, the "zero," occupies double spaces. The 11 keys represent the 10 digits, zero to nine, and the decimal point. The function keyboard 102 has 12 keys arranged in four horizontal rows of three each and representing a number of functions such as addition (+) and multiplication (×). The number of function keys in the keyboard 102 depends on the number of functions preprogrammed in the data processing equipment.

In one embodiment of the keyboard-encoder according to the present invention (FIGS. 7 and 8), each of the digit keys 201 is mounted on and frictionally held by the upstanding portion 221A of the key stem 203A. Similarly, each of the function keys 202 is mounted on the upstanding portion 221B of the key stem 203B. As shown in FIG. 2, the keyboards 101 and 102 are provided with thin underlying mats 220 of resilient plastic foam which allow the upstanding portions 221A and 221B to penetrate therethrough. The set of parallel key stems 203A for the digit keys 201 is divided into groups 204 of three adjacent key stems each (two for the first row) which are mounted on and pivoted about a first shaft 205 transversely disposed adjacent to a first end of the input section. Similarly, the set of parallel key stems 203B for the function keys 202 is divided into groups 204 of three adjacent key stems each, mounted on and pivoted about a second shaft 206 transversely disposed adjacent to a second end of the input section, opposite said first end. Thus, each of the two oppositely positioned shaft 205 and 206 is further away from the array of keys connected to the key stems pivoted thereabout than from the other array of keys. As will be readily apparent, this arrangement of the key stems provides long moment arms and good mechanical advantages for the key stems, for smooth operation of the keyboard-encoder.

Figure 7:
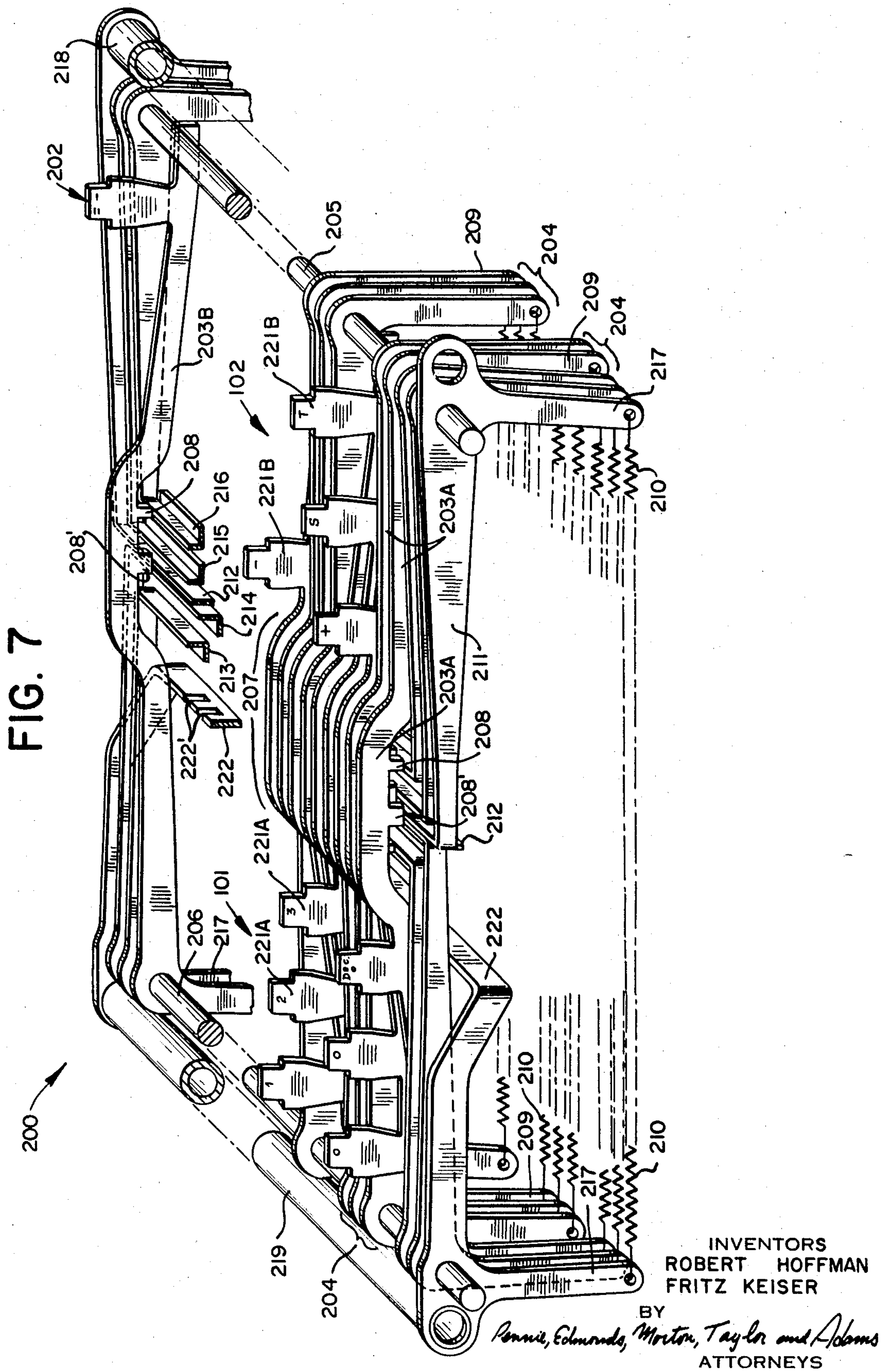
FIG. 7 is a perspective view partially in section and partly broken away showing a part of the keyboard-encoder without the key.

The linear length of the key stems 203A and 203B is longer than the distance between the oppositely disposed shafts 205 and 206. The free ends of the key stems are placed beneath the opposite shafts, thereby limiting their upward movement. The fixed end of each stem has downwardly extending legs approximately perpendicular to the main body of the stem. A plurality of springs 210 joins pairs of approximately oppositely positioned legs 209 to provide a spring bias urging the free ends of the stem 203A and 203B to pivot upwardly, whereby when the key stems are depressed they return to their normal positions defined by the shafts that limit the upward movement of the stems. As shown in FIG. 7, the groups 204 of adjacent key stems are alternately arranged or interposed transversely to the two oppositely disposed shafts 205 and 206.

Each of the key stems 203A and 203B has a raised center portion 207 within which there are one or more selectively positioned actuators in the form of integrally formed and downwardly extending lugs 208. The width and the position of the lugs 208 are selected according to a predetermined code corresponding to the decimal digit or the function represented by the particular key stem to actuated one or more U-shaped bails 212, 213, 214, 215, 216, and 222, the center portions of which are positioned parallelly beneath the raised center portions 207 of and transversely to the parallel key stems 203A and 203B.

The two parallel legs 211 of each of the U-shaped bails are also mounted on and pivoted about shafts 205 and 206. Each leg 211 has at its pivoting end a downwardly extending leg 217, which lets are connected to approximately oppositely placed legs by springs 210 in an arrangement similar to that used for the key stems. The springs 210 thus bias the bails upwardly to engage the lugs 208 of the key stems 203A and 203B. The two legs 211 of each of the two centermost U-shaped bail members 212 and 222 include laterally extending projections between where are mounted shafts 218 and 219, respectively, for providing extra rigidity because these two bails operated under greater stress than the others, as will be apparent from subsequent discussions.

In the present embodiment, bails 213, 214, 215 and 216 serve as numerical bails, and bails 212 and 222 serve as strobe and function bails respectively. The strobe bail is disposed to be actuated by all of the key stems 203A and 203B, while the function bail 222 has selectively positioned slots or notches 222' and is disposed so that it is actuated only by the key stems 203B which are pivotally depressed by the keys in the function keyboard. The numerical bails 213, 214, 215, and 216 are actuable in various combinations by the key stems 203A and 203B depending on the placement of the lugs 208 thereon.

Figure 8:
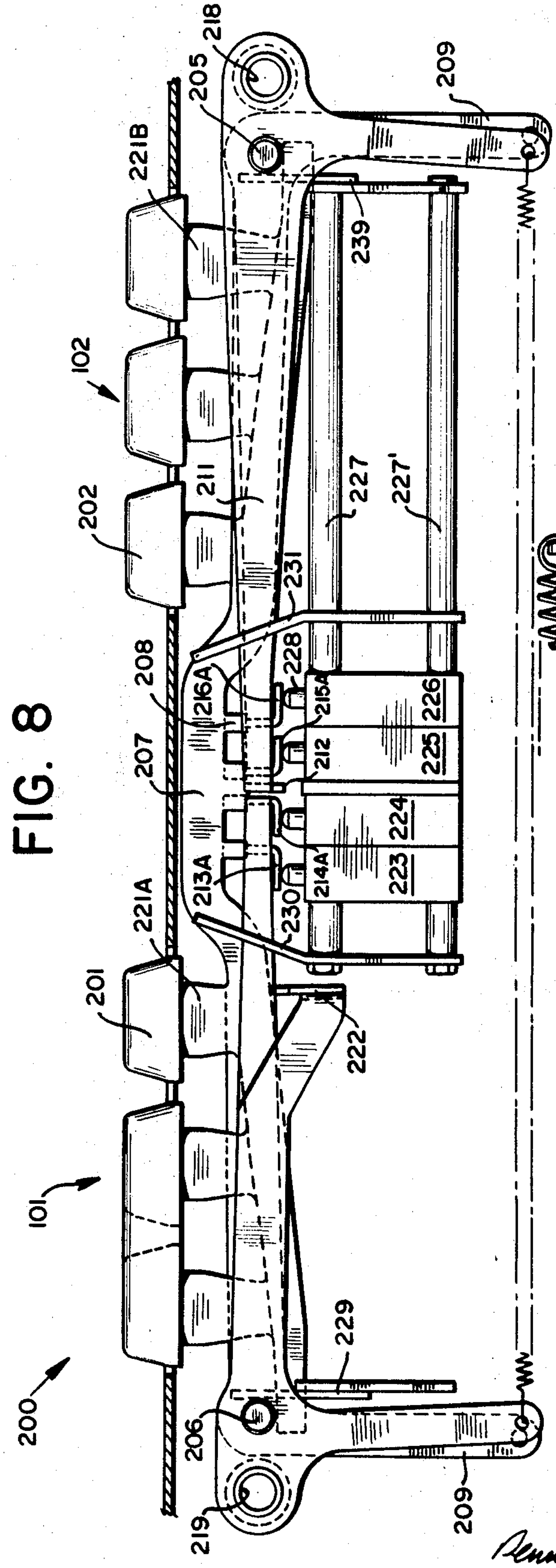
FIG. 8 is a rear view of the keyboard-encoder showing particularly the encoding switches.
Figure 17:
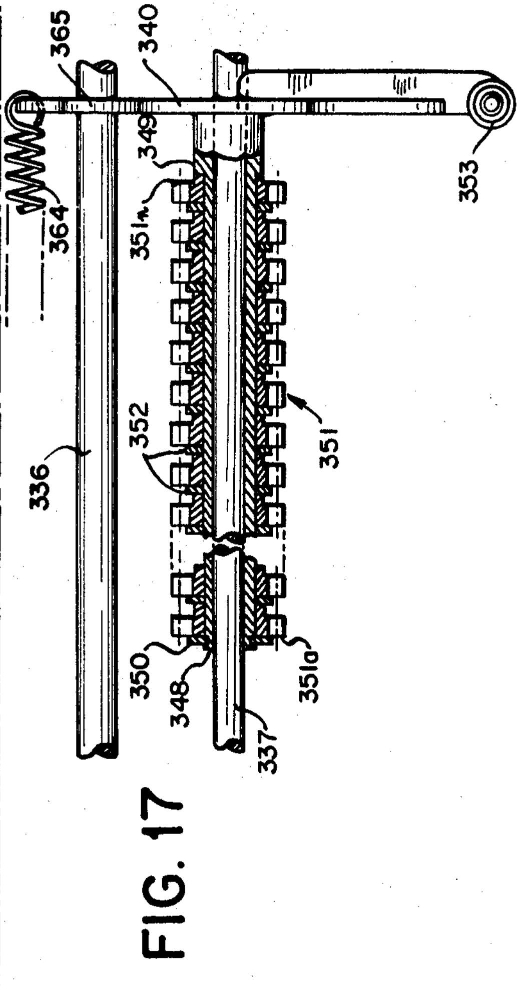
FIG. 17 is a side elevation partly broken away showing part of the converter gear bank carriage.
Figures 9, 10, 10A:
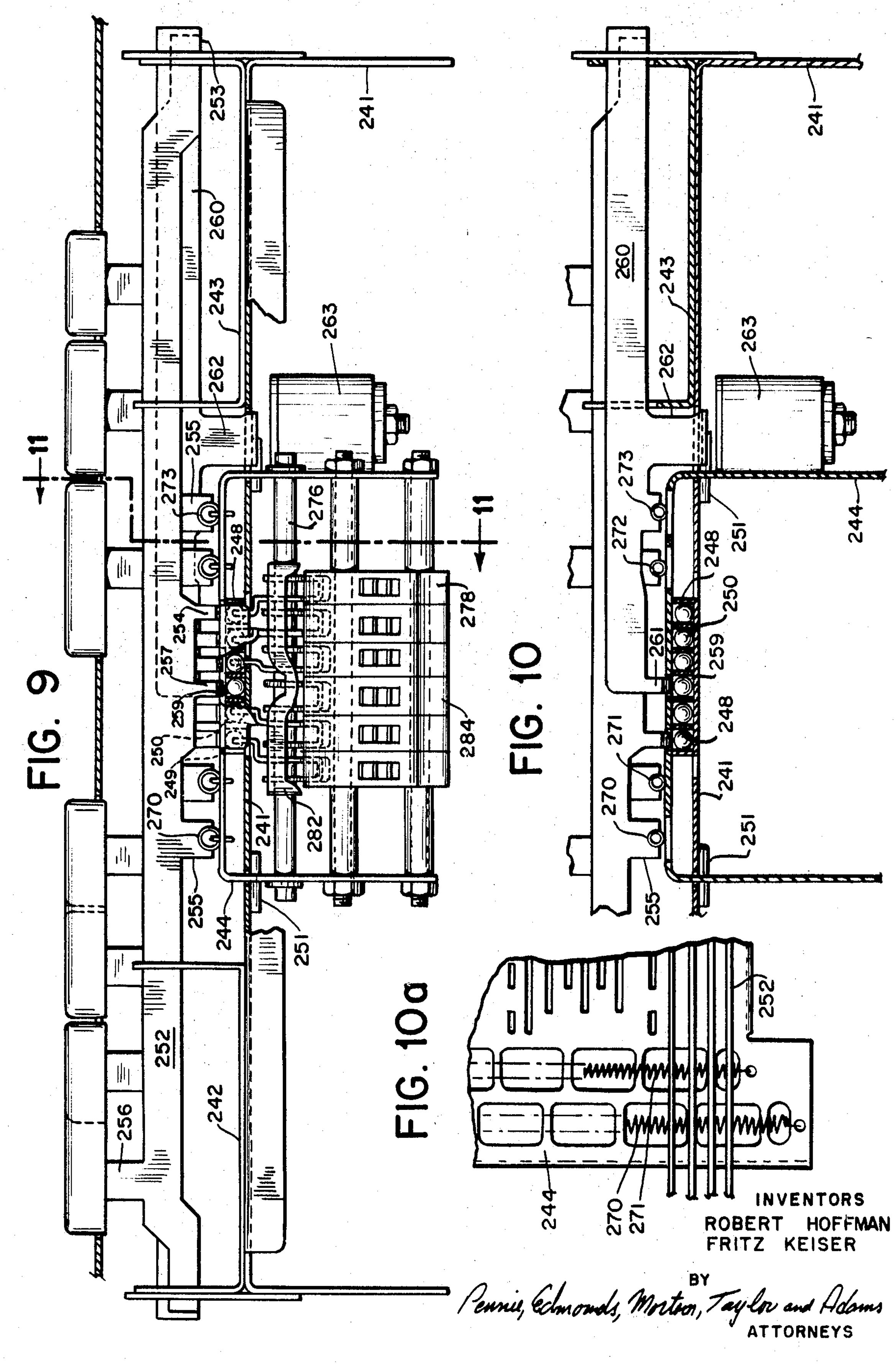
FIG. 9 is a rear view of an alternate form of the keyboard-encoder partially in section and partly broken away.
FIG. 10 is a partial sectional view of the alternate keyboard-encoder taken along the plan indicated by the line 10–10 in FIG. 11.
FIG. 10*a* is a detail plan view of a part of the structure shown in FIG. 10.

Beneath the rear portion of the keyboards there is a bank of four two-way switches 223, 224, 225, and 226 mounted on two parallel supporting shafts 227 and 227' as more clearly shown in FIG. 8. Each of the four switches controls a binary electrical channel by reciprocating between two alternative portions, representing the "0" and "1" binary digits. The switches are operated by spring biased plungers 228 in direct contact with the flat portions 213A, 214A, 215A and 216A of the numerical bails so that the downward movement of the bails depresses the plungers 228 in contact therewith to actuated the corresponding switches operated by them. Upon the upward movement of the bails, the springs bias the plungers 228 to their original positions thereby deactuating the switches.

The binary electrical channels controlled by the switches 223, 224, 225, and 226 have assigned to them corresponding decimal values 1, 2, 4 and 8, respectively. Each decimal digit is encoded to the binary form by activating or deactivating various ones of the four switches to generate a particular permutation of the binary values "0" and "1." The permutation or configuration of activated and deactivated switches represents the binary code for the decimal digit to be transmitted to the data processing equipment and the decoding section.

For entering a decimal number into the terminal, the keys in the digital keyboard are successively depressed corresponding to successive order digits of the number. The depression of each digital key pivots downwardly the key stem 203A operated by it. The lugs or lugs 208 thereon actuated a combination of numerical bails 213, 214, 215 and 216 according to the digital value of the key, as well as the strobe bail 212, by pivoting downwardly the actuated bails. The actuated numerical bails activate the corresponding switches to generate a binary coded electrical signal corresponding to the digital value of the key. (The function and the operation of the strobe bail 212 will be explained in greater detail below).

The function instruction is then similarly entered into the terminal by depressing the key representing the desired function in the function keyboard. The key stems 203B connected to the function keys, however, actuate the function bail 222 in addition to the numerical bails 213, 214, 215, and 216 and the strobe bail 212. The function bail 222 in turn activates a function switch (to be described in greater detail later) which is used in combination with one or more of the four numerical switches 223, 224, 225 and 226 to generate binary coded signals representing the function instructions, which signals differ from the binary signals representing the decimal digits. At least one function instruction is entered for each number to instruct the data processing equipment or the decoding section to perform the preprogrammed function.

Referring now to FIGS. 9 through 13 which illustrate an alternative keyboard-encoder according to the present invention, the decimal digit keys 201 and the function keys 202 are arranged similarly to the first embodiment of the keyboard encoder in two oppositely positioned rectangular arrays to form the two keyboards 101 and 102 as shown in FIG. 1. The keys are connected to a set of key stems 252 parallelly arranged with respect to each other and pivotally movable by the keys 201 and 202 mounted thereon.

Figure 13:
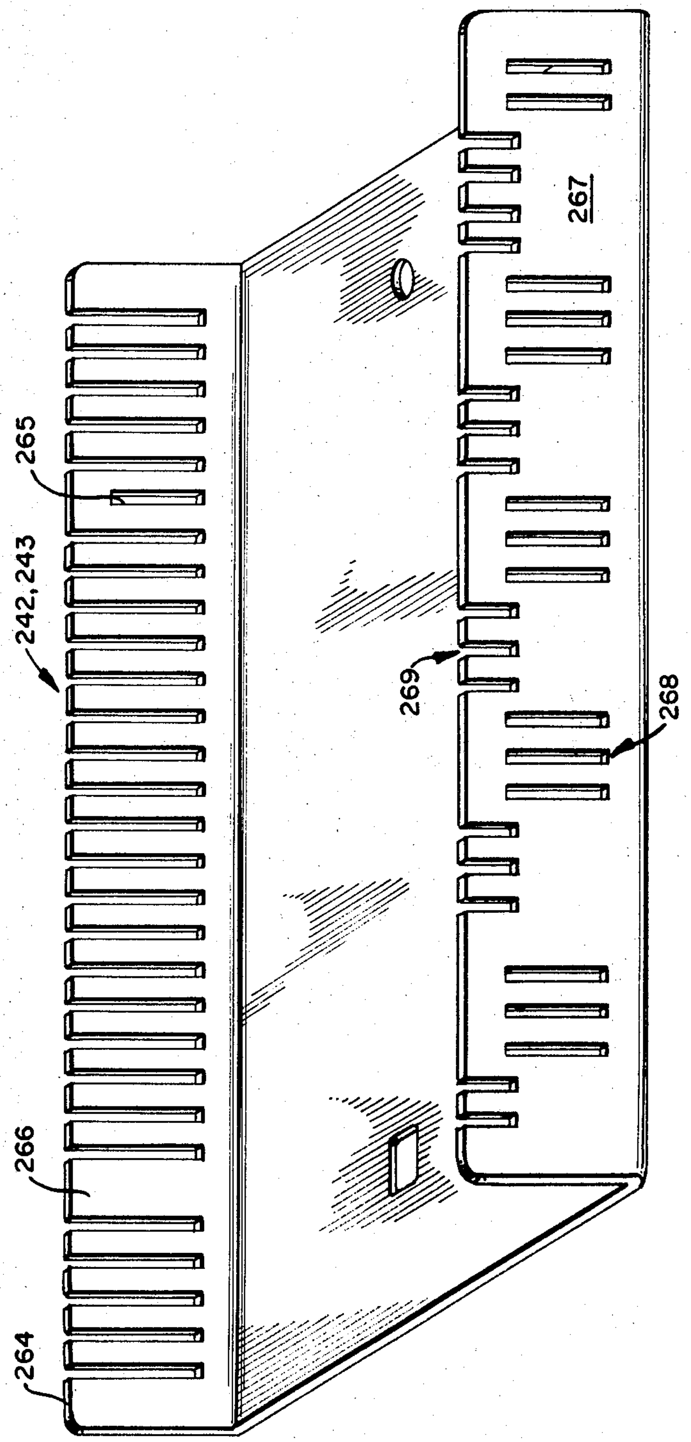
FIG. 13 is a perspective view of a key stem mounting bracket forming part of the alternate keyboard-encoder.

The key stems 252 are parallelly and pivotally mounted on two key stem mounting brackets 242 and 243, which have a generally U-shaped cross section as shown in FIG. 13. The two brackets 242 and 243 are secured on opposite sides of a supporting frame 241 of the keyboard encoder to provide four parallel and upwardly extending sides 242A, 242B, 243A and 243B for parallelly and pivotally supporting the key stems 252.

A supporting structure 244 having an inverted U-shape cross section is mounted on the frame 241 centrally between the two brackets 242 and 243. The top portion 244A of the inverted U-shape structure 244 and the floor of the frame 142 form an enclosed housing 244B which houses plural sets of movable elements such as ball bearings 250 between two upwardly bent knockout portions 241A and 241B of the frame 241 running parallelly across the supporting structure 244. The space within the housing 244B is divided equally by a series of longitudinal spacers 248 forming parallel longitudinally extending raceways or casings 249 for the ball bearings 250.

Figures 11, 12:
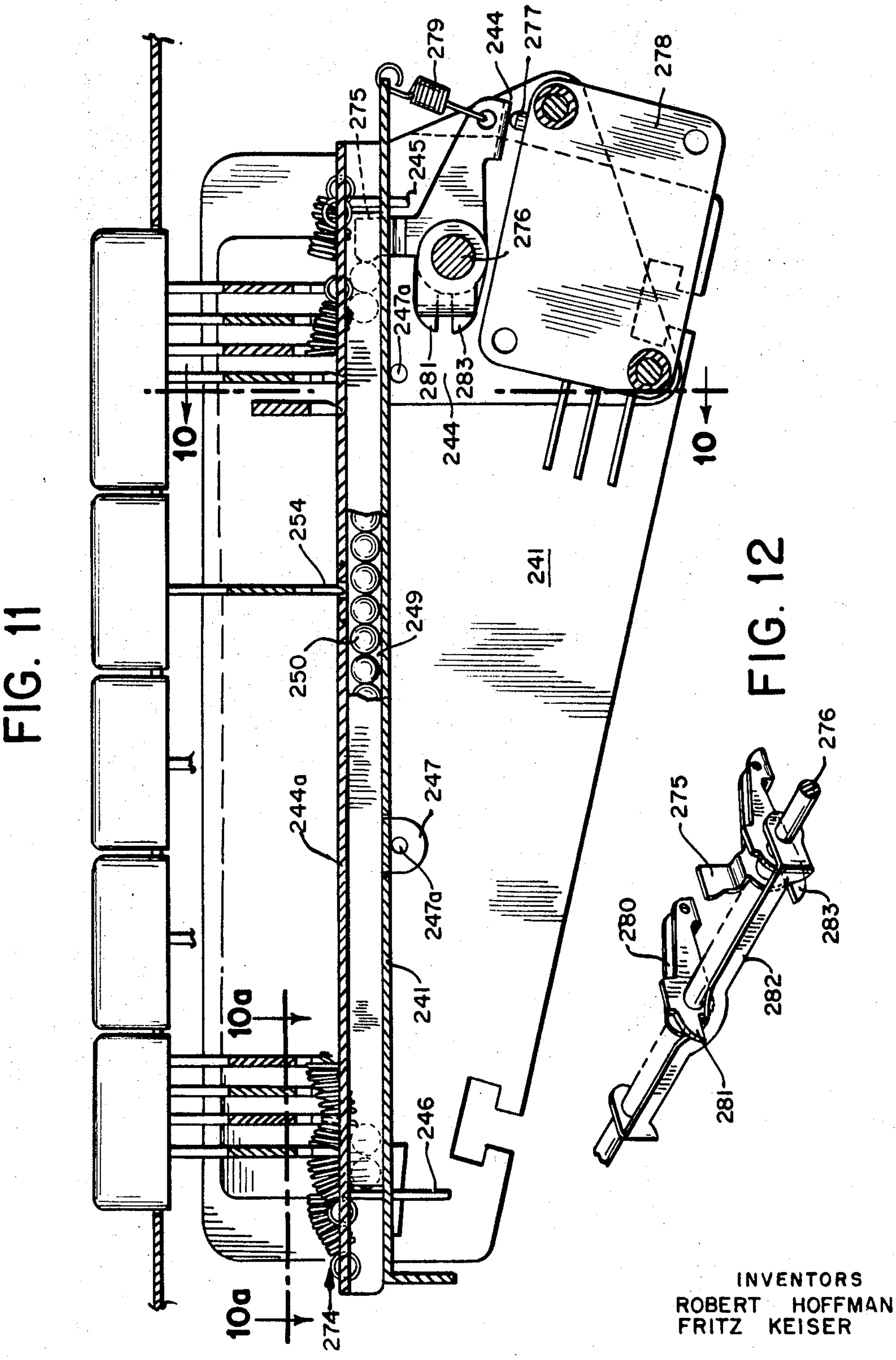
FIG. 11 is a partial sectional view taken along the plane indicated by the line 11–11 of FIG. 9.
FIG. 12 is a perspective view of a detail structure of a strobe bail and a lever arm pivotally mounted on a shaft in the alternate keyboard-encoder.

Each of the ball races is closed at both ends by two downwardly bent tabs 245 and 246 of the upper surface of the inverted supporting structure 241 (as shown in FIG. 11). The height of the races is maintained by pins 251 which are inserted beneath the floor of the frame 241 through the holes 247*a* provided in the side tabs 247 of he floor of the frame 241 and holes 244A in the downwardly extending sidewalls of the supporting structure 244.

The ball bearings in each of the races are closely positioned and, as will be readily apparent, are used to transmit a unidirectional movement upon the pivotal movement of the key stems 252 about one of the brackets 242 and 243. The key stems advantageously are prepared from initially substantially symmetrical and identical forms each having a full complement of six actuators in the from of integrally formed lugs 254 in the center region of the stem corresponding to the six races 249 to be positioned therebelow. Each stem also has four downwardly extending spring retaining lugs 255 disposed on both sides of the center region and a series of upstanding key mounting lugs 256 provided at predetermined places on both sides of the key stem 252, according to the keyboard arrangement, so that there is a key mounting lug 256 in each possible key position, no matter on which side of the frame 241 the particular key stem is ultimately pivoted. All of the lugs 254, 255 and 256 are scored so that all may be broken off except the ones necessary for that particular key stem. For instance, all lugs have been broken off of the particular key stem 252 shown except one key mounting lug 256, one spring retaining lug 255 and two race operating lugs 254 and 258.

The resultant key stems 252 key stems 252 have at least one key mounting lug 256 and one spring retaining lug 255, but may have any number from one to five of race actuating lugs 254. Each of the key stems 252 also has a further actuating lug 257 corresponding to restricting means for the keyboard in the form of a lockout raceway 259.

The lockout raceway is one of the six parallel raceways disposed transversely beneath the key stems. On the top of the casing for the lockout raceway there are a number of entrances corresponding to at least the number of key stems 252. Each of the entrances is positioned directly beneath the lug 257 of the key stem for receiving that lug 257. The ball bearings 250 are closely positioned within the casing of the raceway 259 to provide a total limiting space therebetween less than twice the displacement space caused by the entrance of one of the lugs 257, whereby the entrance of one lug into the raceway reduces the limiting space to less than the displacement space required to admit a second lug, thus preventing the entrance of such second lug. Other than the lug 257 for engaging the lockout raceway, each key stem has a unique combination of race actuating lugs 254 positioned on the key stems according to the predetermined code.

The lockout raceway can be used to lock the keyboard completely against entry of an information by the special provision of a lockout lever 260 (FIG. 10) which has an integral part thereof one lug 261 disposed for entering the lockout raceway 259, a downwardly extending leg 262 and a spring retaining lug 273. The lever 260 is supported in a slot 265 (FIG. 13) upwardly extending side 264 of the supporting bracket 243, and is downwardly movable by an electromagnet 263 mounted on the supporting structure 244 below the leg 262. Upon energization of the electromagnet 263, the lockout lever 260 is driven downwardly so that the lug 261 enters into the lockout raceway 259, thereby locking the keyboard.

Referring now to FIG. 13, the key stem mounting brackets 242 and 243 in which the key stems 252 are mounted may be identical, to minimize manufacturing costs. Each mounting bracket comprises an outstanding inner side 264 which is slotted through its upper edge at regular intervals except at one place where it contains the enclosed slot 265 for the lockout lever 260. For reasons which will become apparent, at a position 266 on the inner side 264 symmetrically opposite the enclosed slot 265, no slot is provided.

The outer side 267 of the key stem mounting bracket contains both closed slots 268 and open slots 269 which are distributed and arranged in such a manner that when the mounting bracket (say 242) is rotated 180° and used as the other mounting bracket (say 243), the outer sides 267 of each of the brackets 242 and 243 are complementary in the sense that the closed slots 268 of one are aligned with the open slots 269 and the other, and vice versa. Therefore, each key stem which is pivoted in one of the open slots 269 is one mounting bracket can extend through a complementary closed slot 268 in the other mounting bracket, which closed slot guides the key stem and limits is upward and downward travel. The lockout lever 260 is pivoted in the slot 269 opposite the closed slot 265 in the same bracket, so that the closed slot 265 limits its upward movement. No slot is provided at position 266 because this position, in a mounting bracket opposite that in which the lockout lever 260 is mounted, contains no key stem.

The key stems 252 are biased upwardly by means of four springs 270, 271, 272, 273 which are stretched between corresponding holes 274 (see FIGS. 10*a* and 11) disposed at the sides of the upper part of supporting structure 244. Thus one of the springs 270 through 273 is disposed in each of the four possible positions defined by the spring engaging lugs 255. The supporting structure 244 has portions cut away (see FIG. 10A) so that when a particular key is depressed, its spring engaging lug 255 and the sections of spring adjacent that lug are depressed through the cut away portions, thus biasing the key stem upwardly. The center region of the supporting structure 244 is slotted forming a plurality of entrances into the raceway 249 so that the race actuating lugs 254 may extend into the respective raceways 249.

As indicated in FIG. 11, when any one of the race actuating lugs 154 extends downwardly into its corresponding raceway, it displaces the balls in the raceway, causing them to move unidirectionally and thereby actuating a bail 282 through a lever arm 275 in contact with the terminating ball, which arm 275 is pivoted about a shaft 276 carried by the housing 244. When the lever arm 275 is rotated clockwise about the shaft 276 by the balls in the corresponding raceway, it depresses a button 277 to actuate a corresponding switch 278. Each of the lever arms 275 fastened to the frame 241, so that as soon as the key stem 254 is lifted out of the ball race, the switch 278 is deactuated.

Instead of a lever arm such as the lever arm 275, a special strobe arm 280 (FIG. 12) disposed beneath the lockout raceway 259, because the lockout raceway does not actuate any switch. The strobe arm 280 has a tongue 281 which cooperates with the bail 282 extending across in front of the lever arms 275 and pivoted about the shaft 276. The bail 282 extends above a series of tongues 283 extending from each of the lever arms 275. Thus when any of the lever arms 275 is actuated by its corresponding ball race, its respective tongue 283 pivots the bail 282 clockwise about the shaft 276, thereby operating the strobe arm 280 to actuate the strobe switch 284 disposed to be actuated by it.

The switch actuating levers 275, bail 282, and strobe switch arm 280 are so constructed that when any actuated lever 275 rotates the bail 282 and the strobe tongue 281, the switches 278 will be actuated before the strobe switch 284, thereby providing delay between closure of code generating switches 278 and strobe switch 284 to prevent false code generation.

It is thus clear that actuation of any key, depressing the key stem on which it is mounted, causes the particular combination of race operating lugs on the key stem to actuated a unique code combination of switches 278 through the medium of the corresponding ball races. The operation of the switches to generate the binary coded signals in this embodiment is similar to hat of the first embodiment.

The electromagnet 263 which are used to lock the keyboard may be connected advantageously to the associated data processing equipment, thereby giving the latter the prerogative of accepting or rejecting entries into the keyboard. This arrangement thus avoids the possibility of entering a new set of information to the data processing equipment while the first set is being processed.

3. Decoding Section

It is the function of the decoding section 300 (described in conjunction with FIGS. 14 through 19) to receive a sequence of binary coded electrical signal combinations either from the keyboard encoder section 200 or from an external source, each signal combination corresponding to a decimal digit or a function symbol, and to set up a number corresponding to such digits or symbols in a register.

The decoding section has, broadly stated, a plurality of decoding elements and a register. The decoding elements include a bank of coded mechanical elements spaced apart and mounted on a rotatable shaft. Each of the mechanical elements has one or more actuators, and each of said actuators is positioned on its respective coded mechanical element at a predetermined angular relation with respect to a fixed plane that includes the axis of the rotatable shaft. A power source is connected to drive the rotatable shaft cyclically, and in each of the cycles, which represents one decoding operation, the rotatable shaft is driven through a predetermined angle with respect to the fixed plane. There are a number of converter elements, equal in number to the coded mechanical elements, spaced apart and mounted on a second rotatable shaft. Each of the converter elements is reciprocable between an active and inactive position. In the active position each converter element is driven by one or more of the actuators, sequentially when more than one actuator is driving it, to rotate about the axis of the second rotatable shaft through an angle depending on the number of angularly positioned actuators rotating said converter element.

A set of signal responsive elements capable of receiving the electrical signals in the second predetermined code form is used to actuate one or more of the converter elements, according to the received electrical signals, to the active position.

A decoder entry gear is mounted on the rotatable shaft and is rotatable by said shaft through a total angular displacement equivalent to the combined angular rotations of the converter elements. The total angular displacement represents the output information corresponding to the electrical signals.

The register of the decoding section comprises a frame, a shiftable carriage laterally slidable on said frame, an ordinal series of storage gears serving as the storage elements and mounted on and rotatable about a shaft of said carriage, and shift means for stepwise shifting the carriage to bring said storage gears successively to an actuating station to be driven by said decoder entry gear through a predetermined angular rotation about said shaft corresponding to the rotation of the decoder entry gear.

The coded mechanical elements preferably are in the form of a bank of decoder wheels 306*a*, 306*b*, 36*c* and 306*d* spaced apart and mounted on a rotatable decoder shaft 307 to form a decoding drum 306. The shafts 304 and 307 as well as other shafts are shown scored at certain places to represent that the shafts extend through and are supported by the frames 116, !117 or 118 at those places.

Figures 15, 20:
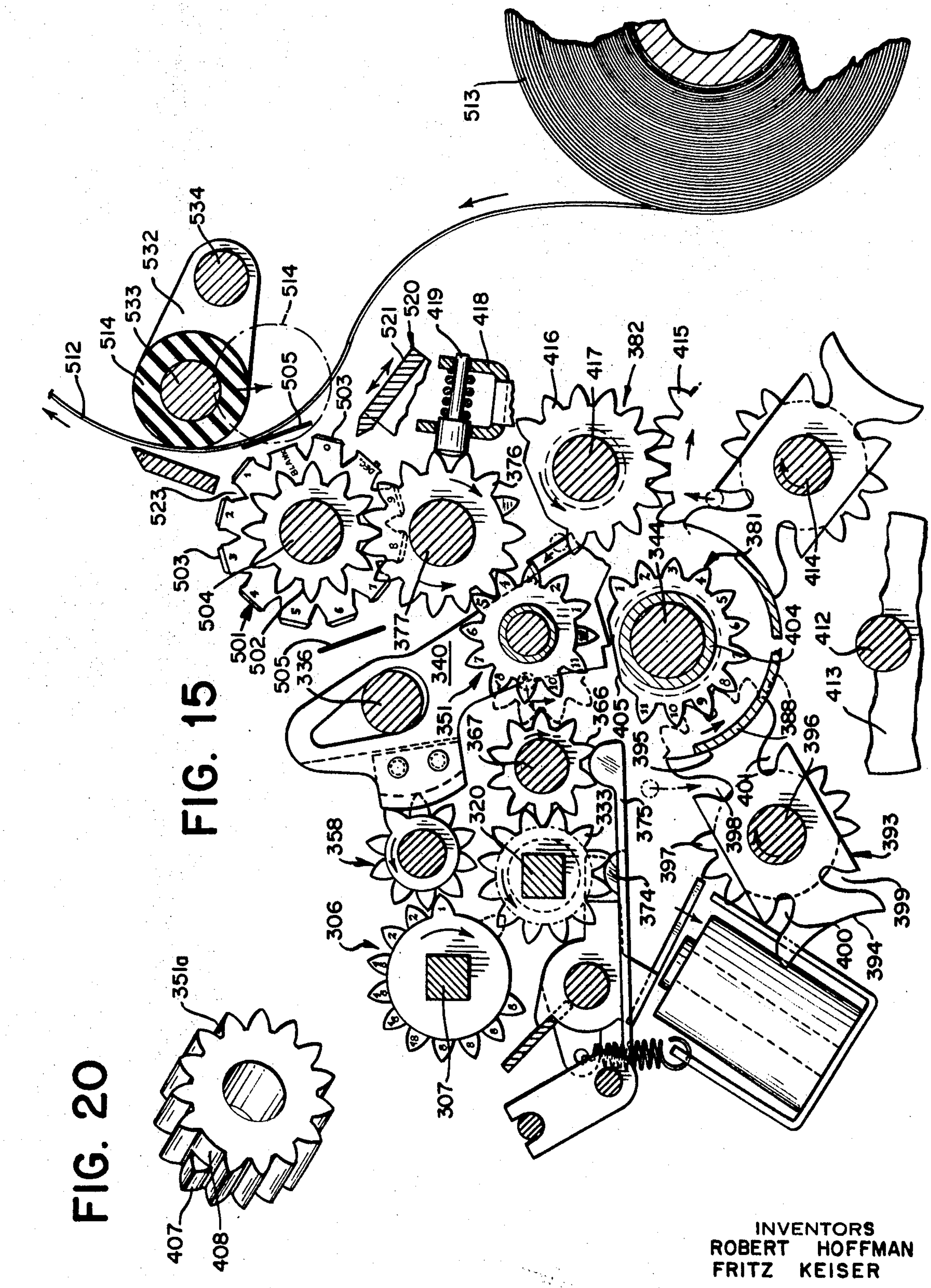
FIG. 15 is a partial sectional view showing the relationship of various gears in the decoding and printout sections.
FIG. 20 is a perspective view of a gear in the converter gear bank.

The decoder shaft 307 is connected by means of an electromagnetically controlled single-revolution spring clutch 308 to the constantly rotating drive shaft 110. Actuation of the spring clutch 308 connects the decoder shaft 307 to the drive shaft 110 for a single revolution of the former, which constitutes a decoder cycle. This controllable single cycle operation of the decoder shaft 307 is obtained by means of a spring clutch control cam 309 which forms a shoulder 310, and on which rides an actuator 311 pivoted about a shaft 312. The actuator 311 is controlled by an electromagnet 115 which, upon actuation, attracts a clapper 313, causing the bracket 314 to pivot about the shaft 315 on which it is mounted. This motion is transmitted through a link 316 to rock the actuator 311 off of the shoulder 310, thereby engaging the spring clutch 308. Immediately upon completion of the decoder cycle the electromagnet 115 is deenergized, as will be explained, and the spring 317 urges the actuator 311 radially inward toward the spiral cam 309. At the end of the decoder cycle the should 310 stops against the actuator 311 and locks the decoder shaft 307. To assure that residual magnetism in the electromagnet 115 does not prevent engagement by the actuator of the shoulder 310, a cam 318 is provided (FIG. 2) on the decoder shaft 307 which acts on the cam follower 319 to force the trip link 316 forward and, by virtue of the slot 316*a* in link 316, to permit spring 317 to rotate actuator 311 into engagement with shoulder 310 at the end of the revolution of shaft 307. Thus, the decoder drum 306 is driven through a single revolution during each decoder cycle. The decoder wheels 306*a—d* preferably are in the form of gear segments having one or more gear teeth according to a binary code, such as the natural binary code of 1, 2, 4 and 8. The gear teeth on the 1, 2, 4 and 8 gear segments are angularly aligned with respect to a plane 307A that includes the axis of the shaft 307 as shown in FIG. 15, in which the gear teeth are identified as belonging to the 1, 2, 4 and 8 segment so that the gear tooth for the "1" decoder wheel precedes the gear teeth of the "2" decoder wheel, and so forth. For decimal digital output the first four gear teeth of the "8" decoder wheel 306*d* may have the same angular relationship with respect to the fixed plane 307A as the four gear teeth of the 4" decoder wheel 306*c* since the number of gear teeth required for decoding is 11, corresponding to the 10 digits and a decimal place. These 11 gear teeth as shown in FIG. 15 are equally spaced along the decoder drum 306 covering about two thirds of the available circumference.

A converter gear shaft 320 is disposed parallel to the shaft 307 and on the former are mounted four identical converter gears 321*a—d*. The converter gear shaft 320, decoder drum 306 and related parts of the decoder are shown in greater detail in FIGS. 14*a* and 14*b*. Converter gear 321*a* includes an annular stop 322*a* extending to the right and a shoulder 323*a* extending rightwardly of the annular stop. Each input gear 321 is slidably but nonrotatably mounted on the shaft 320, which is provided with spaced slots in which retaining clips 320*a—d* are engaged. The input gears 321 are biased rightwardly against respective clips 320*a—d* by springs 324 which abut washers 324′ adjacent respective clips 320*a—d*.

Figure 14:
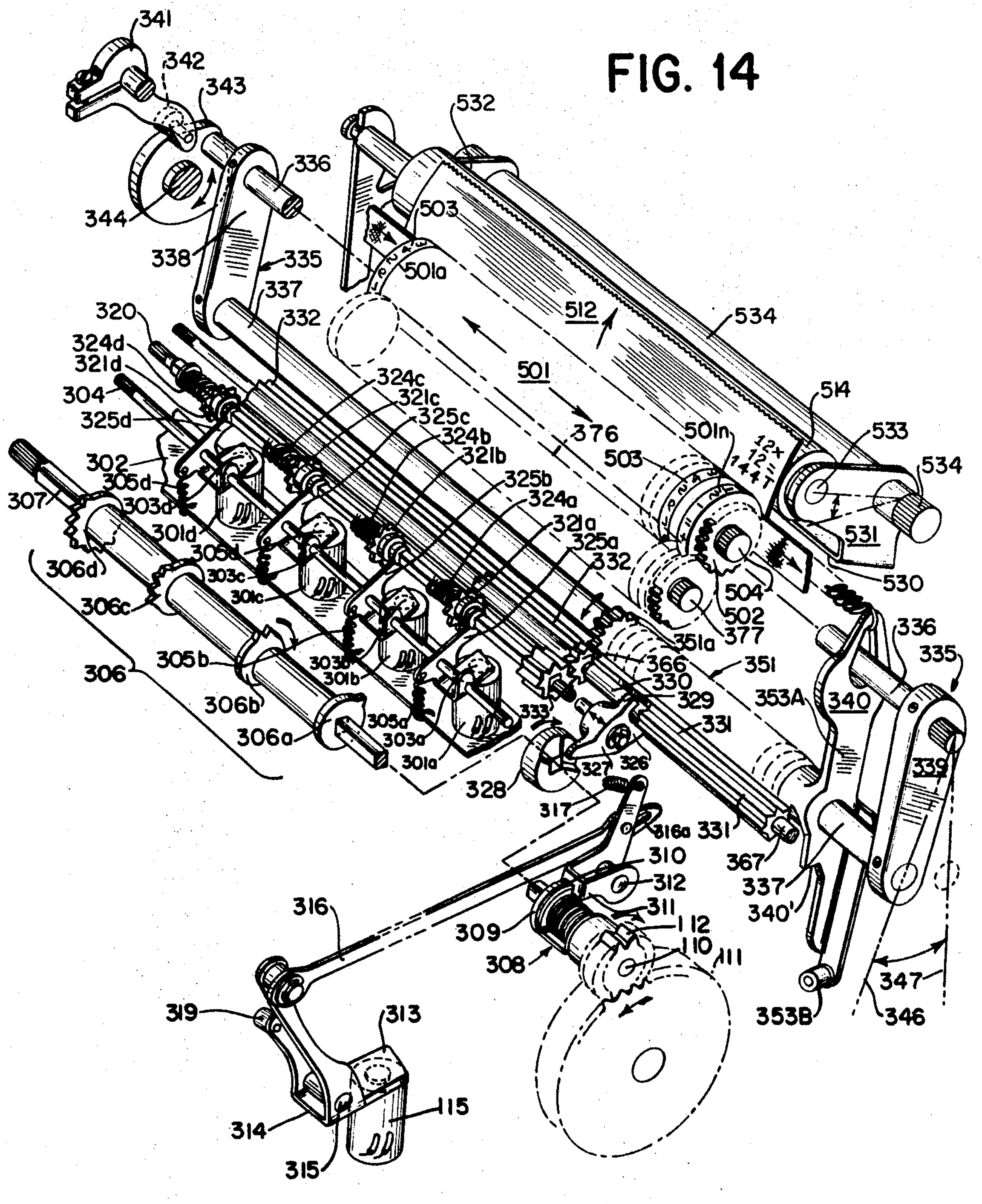
FIG. 14 is a perspective, partly exploded view of the decoding printout sections illustrating their overall operation.

An arm 325*a* (FIG. 14*b*) formed integrally with the clapper 303*a* extends adjacent the stop member 322*a* and is urged into contact with the converter gear shoulder portion 323*a* by the spring 305*a* (FIG. 14).

On the right end of the input shaft 320 is a shift arm 326 with a finger 327 which engages a converter shaft shift cam (an end cam) 328 mounted on the decoder shaft 307. The end of the converter shaft shift cam 328 is so formed as to move the finger 327 (and thus the converter shaft 320) rightwardly during a portion of each decoder shaft cycle. The shift arm 326 is prevented from rotating by a yoke 329 formed as an extension of the shift arm and which cooperates with an adjacent bare portion 330 of the gear blank 331. The gear blank 331 as well as the gear blank 332 remain stationary at all times, as will be explained.

When the rightward movement of the input shaft 320 occurs, each of the input gears 321*a—d* which is not held back (in its inactive position) by corresponding arm 325*a—d* moves to the right and is aligned with a corresponding one of the 1, 2, 4 and 8 gear segments 306*a—d*. If any of the input gears 321 is prevented by the corresponding arm 325, acting upon its associated stop element 322, from moving to the right (its active position) along with the input shaft 320, the input gear so prevented will not mesh with the corresponding gear segment 306.

The arms 325*a—d* which control the lateral reciprocating movement of the converter gears 321*a—d* between the active and the inactive positions are, as mentioned before, integral parts of the clappers 303*a—d*, respectively, and are pivotally mounted on shaft 304. The pivotal movements of the clappers, and thus of arms 325*a—d*, are controlled by four electromagnets 301*a—d* mounted on a frame member 302 extending between the parallel frames 116 and 117 and positioned beneath corresponding clappers for attracting them, upon energization, to thereby move the arm away from the converter gears 321*a—d*. Each electromagnet is connected to a corresponding one of the 1, 2, 4 and 8 channels and is energized by the occurrence of a binary "1" on that channel. Thus whether or not an arm 325 is removed by the actuation of its controlling electromagnet 301 from the patch of the associated converter gear determines whether, for each decoding cycle, that converter gear 321 is in mesh with its respective coded wheel gear segment 306.

Figure 14A:
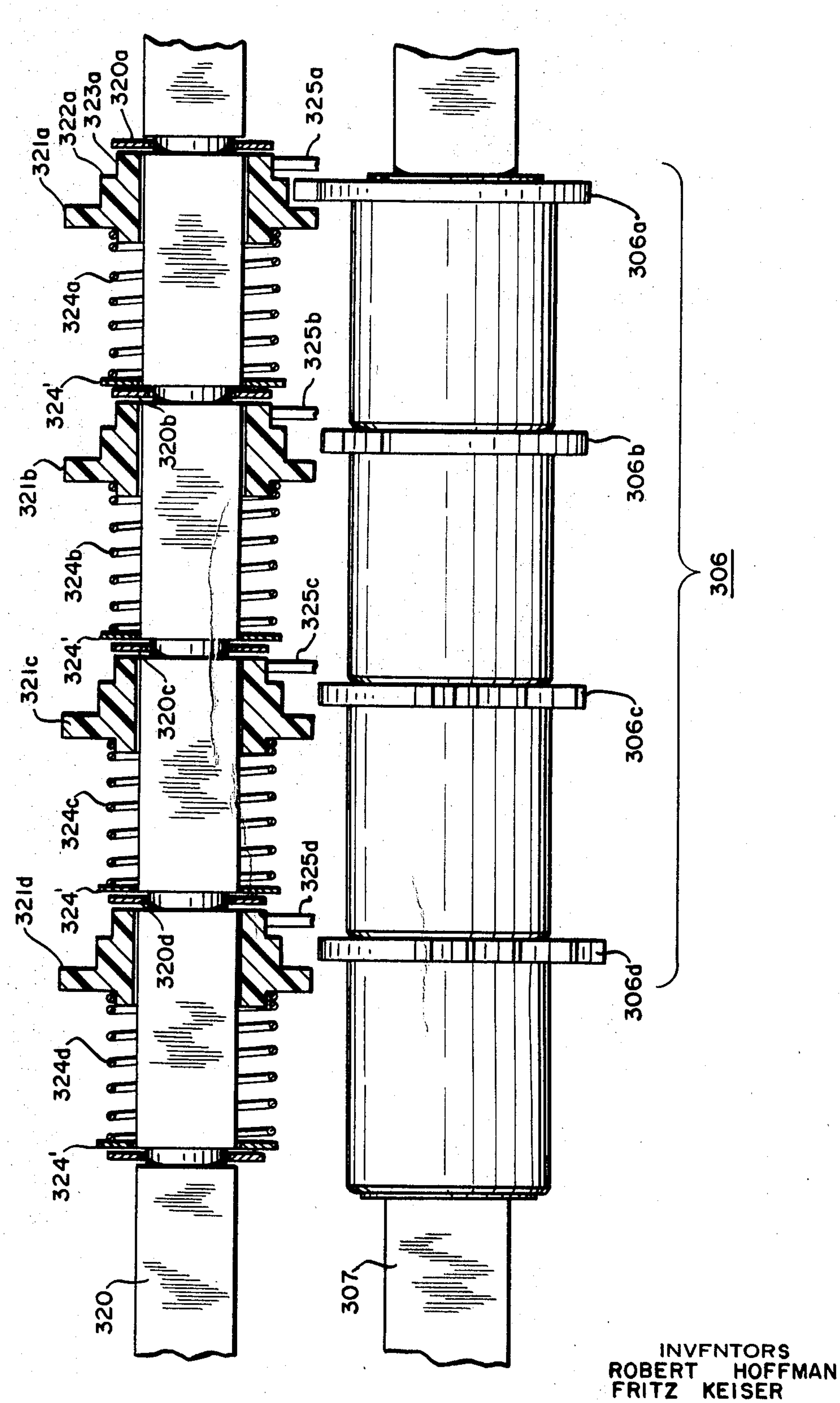
FIG. 14*a* and 14*b* are enlarged views, partly in section, of the decoding parts.
Figure 14B:
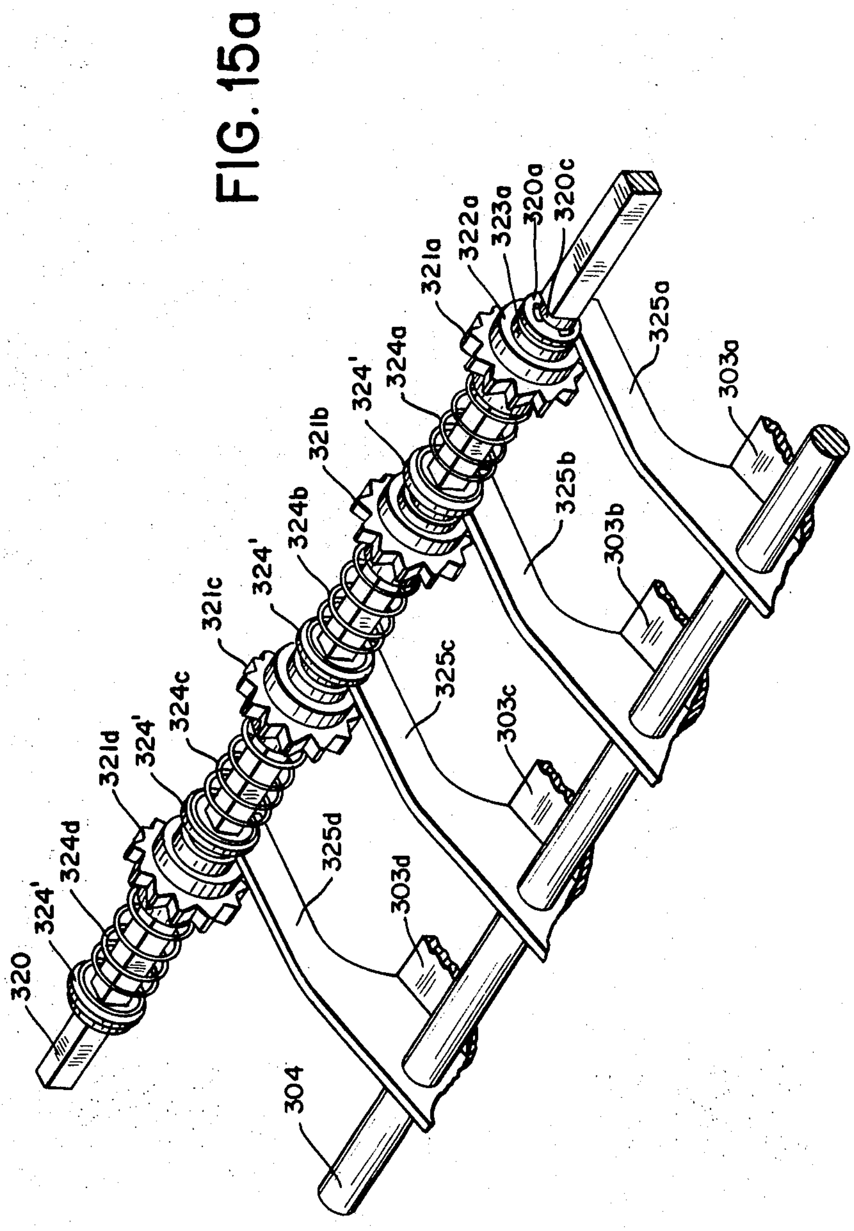

Referring now particularly to FIG. 14*a*, the location of each of the gears 3211*a—d* is detailed so that a space is provided between the stop elements 322 and arms 325 whenever shaft 320 is in the leftward or home position. Since the electromagnets 301 corresponding to the channels on which binary "1"s are received are energized before shaft 320 is moved rightwardly, this space between stop element 322 and arms 325 will allow easy movement of the selected arms out of the path of the associated stop elements without the former having to overcome any friction.

To initiate a decoding, or single digit cycle, an electrical signal is transmitted to the decoder shaft clutch control electromagnet 115 which, as explained above, initiates rotation of the decoder shaft 307 through one full revolution.

Simultaneous with the signal for initiating a decoder cycle, a set of binary electrical signals is sent to the decoder electromagnets 301*a—d* over the corresponding channels. Each of these electromagnets can be either actuated or not during a given decoder cycle, depending on occurrence of a "1" or "0" signal on that channel. The absence of an electrical signal to actuate a particular electromagnet 301 represents a binary "0," and the presence of such a signal represents a binary "1."

For example, in decoding binary coded signals representing the decimal digit "3," the incoming signals will energize electromagnets 301*a* and 301*b*, but not the remaining electromagnets 301*c* or 301*d*. This causes the clappers 303*a* and 303*b* to be attracted downwardly, pulling the arms 325*a* and 325*b* away from the converter gears 321*a* and 321*b* and allowing the latter to be moved to the right, to their active positions. The sequence of events after the energization of the electromagnets 301*a* and 301*b* is as follows: the end cam 328 first reaches a point in its rotation where it begins to act upon the finger 327 causing the input shaft 320 to move to the right. As the input shaft 320 moves to the right, input gears 321*a* and 321*b* move to the right with it, since their paths are not blocked by the respective arms 325*a* and 325*b*. The converter gears 321*c* and 321*d*, however, are prevented from moving rightwardly with the shaft 320 by the arms 325*c* and 325*d* acting on their respective converter gear stop elements 322*c* and 322*d*, so that the converter shaft 320 slides through them to the right. This rightward movement of selected input gears 321 corresponding to these electromagnets 301 to which binary "1" signals have been applied aligns the selected converter gears 321 with corresponding gear segments of the decoder drum 306. In this case, gear segments 306*a* and 306*b* are aligned with corresponding input gears 321*a* and 321*b*, whereas decoder gear segments 306*c* and 306*d* are not aligned with input gears 321*c* and 321*d*.

After the input shaft 320 has shifted to the right, the decoder shaft will have rotated to the point where the single tooth, of the gear segment 306*a* (the binary "1" gear) meshes with the input gear 321*a* which then rotates the input shaft 320, and with it the decoder entry gear 333, through an angle corresponding to its single tooth, which angle is representative of the decimal value 1. Then, as the drum 306 rotates, the two teeth of the gear segment 306*b* (the binary "2" gear) mesh with the input gear 321*b* to rotate the input shaft 320 through an additional angle corresponding to a decimal value of 2, so that the total angle or angular displacement from its original position of the input shaft represents the decimal value 3.

In general, as is more clearly seen from the sectional view of FIG. 15, the complete revolution of the decoder shaft 307 drives the input shaft 320 through an angle corresponding to a number of gear teeth equal to the decimal equivalent of the binary coded signals sent to the electromagnets 301. The binary "1" segment 306*a* rotates the converter shaft 320 through an angle corresponding to a single tooth, the binary "2" segment 306*b* rotates the converter shaft 320 through an angle corresponding to two gear teeth, and so on.

The converter shaft 320 is biased leftwardly by a spring 334 (which is heavier than the springs 324) (FIG. 6) which (FIG. 6) which acts between a washer 335 fastened to the converter shaft 307 and the entry gear 333. The latter is slideably mounted on the converter shaft and abuts the frame member 117 (FIG. 2) so that it does not move to the right with the converter shaft. Just before completion of the full revolution of the decoder shaft 307, the end cam 328 permits the converter shaft 320 to return to its leftward, or home, position under the action of the compressed spring 334.

During each decoder cycle, it has now been shown that a binary electrical representation of a digit is decoded into its decimal equivalent in terms of the angle of rotation of the decoder entry gear 333.

The thus decoded information, which is represented by the angular displacement of the decoder entry gear 333, is successively stored in the ordinal series of storage gears 351*a*...351*n* forming the register 351. The register, as stated briefly hereinabove, is mounted on a frame 335 (FIGS. 14 and 16) including two parallel shafts 336 and 337 joined near their respective ends by two rigid arms 338 and 339 movable between an input position (centerline 346) and an output position (centerline 347). A carriage 340 is shiftably mounted on the frame 335. The ordinal series of storage gears comprising the register 351, which is rotatable about an axis parallel to the converter gear shaft 320, is laterally shiftable on the frame 335 so that each gear 351*a*...35*n* is brought into an actuating position to be driven by the decoder entry gear 333. This is accomplished by stepwise shifting the carriage 340 laterally while the frame 335 is in the input position.

The shiftable carriage 340 includes a sleeve 348 (FIG. 17) slideably mounted on the shaft 337. Rotatably mounted on the sleeve 348 is the ordinal series of decimal digital storage gears 351*a*...351*n*, spaced apart thereon by keepers 352. The storage gears 351*a*...351*n* are held in place on the sleeve 348 between an abutment 349 formed at one end, and a keeper 350 at the opposite end. Adjacent to the abutment 349 and forming an integral part of the carriage 340 are two oppositely extending arms 353 and 353A. The arm 353 extends downwardly and carries a restoring cam follower 353B. The upwardly extending arm 353A has a cutout portion which is large enough to allow the upper shaft 336 of the frame 335 to pass therethrough. The forward edge of the arm 353A forms a cam surface 365 for controlling stepwise shifting of the carriage 340, as will be explained below.

Figures 16, 16A:
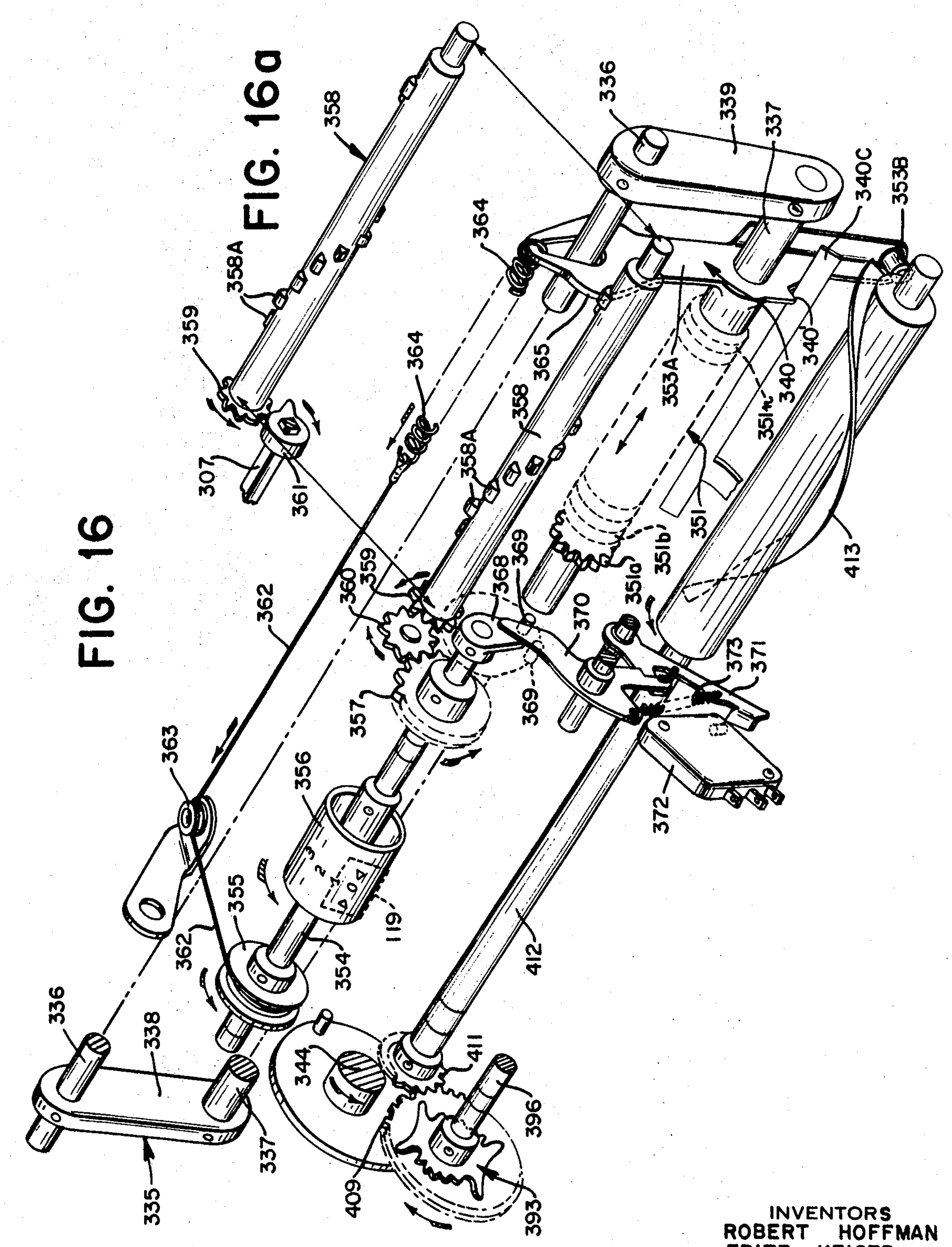
FIG. 16 is a perspective, partly exploded view, illustrating the encoder carriage stepping mechanism.
FIG. 16*a* shows a detail part of the structure shown in FIG. 16.

Referring to FIGS. 16 and 16*a*, stepwise shifting of the carriage 340 is accomplished by a shifting mechanism which includes an ordinal shift control shaft 354 mounted on the left side of the frame 335 between the two frame members 116 and 117. Mounted on and rotatable by the shift control shaft are a windup drum 355, a circumferentially numbered indicator drum 356, and a gear wheel 357. An escapement drum 358 in the form of a rotatable shaft is mounted between the frames 117 and 118 and has thereon a plurality of stop elements 358A in the form of gear teeth spaced along a helical path on the periphery of the shaft 358 at distances (between the stop elements) corresponding to the distances between the storage gears 351*a*...*n*. The escapement drum 358 carries a drive gear 359. The gears 357 and 359 substantially abut the right side of the center frame 117, (not shown in FIG. 16), upon which is mounted an idler gear 360 disposed to mesh with both the drive gear 359 and the gear 357 on the shift control shaft 354. As more clearly shown in FIG. 16*a*, a single-toothed drive gear 361 is mounted on the decoder shaft 307 just to the right of the center frame member 117, and in driving relationship with the escapement drum drive gear 359. A length of flexible cord 362 is anchored to the windup drum 355 and extends about a pulley 363 rotatably mounted on the frame of the device to one end of a spring 364, the other end of which is fastened to the arm 353A forming the upper extension of converter carriage 340.

The escapement drum 358 is disposed to abut the cam surface 365 of the arm 353A, which cam surface is shaped to cooperate with the shoulders of the stop elements 358A on the escapement drum 358 in such a manner as to prevent the lateral movement of the carriage, which is urged leftwardly by the spring 364. As the escapement drum 358 rotates (in a counterclockwise direction as seen in FIG. 16), the stop elements 358A rotate upwardly, so that the stop element engaging the cam 365 disengages from the cam surface to allow the carriage 340 to move leftwardly until it is stopped by the adjacent stop element, which rotates into the patch of the cam surface.

As the carriage shifts leftwardly, the storage gears 351*a*...*n*, beginning with the leftmost gear 351*a*, are successively brought to the actuating position to be driven by the decoder entry gear 333 through the entry idler gear 366 through a predetermined angular rotation corresponding to the rotation of the entry gear 333. The resultant angular rotation of each storage gear represents the decimal value corresponding to the binary signals from which it was generated.

In its home or rightmost position, the gear bank or register 351 is disposed such that the leftmost gear 351*a* is in mesh with the input idler 366. At a point in the decoder shaft cycle just after the gear wheel 351*a* has been set up (i.e., rotated to an angle corresponding to the input), the single tooth of the gear 361 (FIG. 16A) engages the escapement drum drive gear 359, rotating the escapement drum 358 a fixed angle sufficient to allow the engaged stop element to disengage the cam surface 365 and to allow the succeeding stop element on the drum to come into engagement with the cam surface, as it moves to the left, so that the gear bank 351 steps one ordinal position to the left and the next storage gear 351*b* meshes with the input idler 366.

As the escapement drum drive gear 359 turns, it rotates the ordinal shift control shaft 354, through the idler 360 and the drive gear 357, thereby winding up the flexible cord 362 on the windup drum 355 to maintain the spring 364 under a constant average tension through the entire input operation. Because the spring 364 is under the same tension for each ordinal shift of the gear bank 351, the carriage 340 shifts in an extremely smooth and uniform manner, avoiding the nonuniform motion encountered in that type of apparatus in which a spring undergoes a substantial variation in tension with each complete cycle of carriage movement.

As the shift control shaft 354 rotates, one increment for each revolution of the decoder shaft 307, the order indicator drum 356 displays through a window 119 in the cover 100 a number representing the order being set up or stated alternatively the number of digits which has been set up in the bank of storage gears 351. For example, when the first storage gear 351*a* is being set up, the drum 356 shows "0," and when the storage gear 351*b* is being set up, it shows a "1," indicating that one digit has entered the register. (The total number of digits entered will be equal to the order of the indicator drum 356 because the last digit entered in the register always carries a function symbol rather than a digit; therefore, the total number of digits in the number is one less than the number of entries to the register.

In some cases, the total number of digits in the number constituting the input to the terminal is greater than the capacity of the device, that is, the capacity of the register gear bank 351. For such cases, an overcapacity lockout is provided to indicate when the capacity of the gear bank has been reached and to prevent the input of lower order digits to the device. An over capacity trip arm 368 is mounted on the shift control shaft 354 so that a trip pin 369 extending from its end trips the overcapacity switch 370 after the lowest order gear wheel 351*n*¹1 in the register has been set up. This releases the overcapacity switch actuator 371 which closes the overcapacity switch 372 under the action of the spring 373 thereby initiating and transmitting an electrical signal to the associated data processing equipment locking out any further input digits to the decoder.

While the frame of the shiftable carriage 340 is at the input position 346, all the storage gears 351*a*...351*n* are locked except the one in the actuating position to be driven by the entry gear 333. The locking device for accomplishing this is in the form of two sections of stationary gear blank 331 and 332 disposed on opposite sides of the idler 366 on the shaft 367. Each storage gear 351*a*...351*n* is in mesh with and held stationary by the gear blanks 331 and 332, both before it is actuated and immediately after decimal information is stored therein. In addition, detents 374 and 375 (FIG. 15) are provided which prevent unwanted rotation of the input shaft 320 and the entry idler 366, respectively, and thus prevent backlash and overshoot in the decoder.

4. Transfer Mechanism

After an ordinal series of decimal digits, which represent a numeral output of the decoding section, is completely stored in the bank of storage gears 351 of the carriage 340, the contents of the register is ready to be transferred to a bank of print wheels 501 (FIG. 15). The transfer operation involves pivoting the carriage 340 on the frame 335 from the input position (wherein, as described previously, the ordinal series of storage gears 351 is driven successively by the decoder entry gear 333) to an output position wherein the contents of the storage gears 351 are simultaneously transferred in parallel to the print wheels 501.

Broadly stated, the transfer mechanism comprises a power source, a bank of reset gears connected to and cyclically driven by the power source, a cam follower mounted on the frame of the register, and a periodically rotating cam surface in rotational engagement with the follower for moving the frame from the input to the output position, after the storage gears have completed the receipt of the set of output information from the decoder causing the storage gears to come in driving relationship with a bank of reset gears. In this manner, upon rotation of the reset gears, the contents of the register is transferred simultaneously to the print wheels. Thereafter, the carriage is returned to its home position by the further permissive action of the cam surface on the follower, moving the frame 335 back to its input position, upon which carriage return means return the carriage to its initial position as will be described below.

Referring to FIG. 14, the upper shaft 336 of the register frame 335 is rotatable supported in the frame members 116 and 118, and extends to the left of the terminal where a control crank 341 is mounted on it. The control crank 341 extends to form a cam follower 342 which coacts with a rocker cam 343 mounted on the main shaft 344. A torsion spring 345 (FIG. 6) disposed about the shaft 336 and acting upon the frame member 116 urges the rocker frame 335 to its forward, or input, position denoted by the centerline 346 of FIG. 14. Rotation of the rocker cam 343 by the main shaft 344 after the storage gears 351 have been completely set up (or as many orders thereof as there are input digits have been set up) causes the control crank 341 to rotate the shaft 336, rocking the entire frame 335 counterclockwise about it in the vertical plane to its rearward, or output, position denoted by the center line 347 in FIG. 14.

In the output position of the carriage, those storage gears **351*a*...351*n* which have been set up are aligned with corresponding gears of an idler gear bank 376 (FIG. 15) the gears of which are aligned with and in mesh with the corresponding drive gears 502 of the print wheel bank 501. The print wheel bank is made up of print wheels 501*a*...501*n* rotatable about the shaft 504. Each print wheel has an adjacent drive gear 502. The rim of each print wheel 501 is divided into twelve print facets 503 (FIG. 24), each of which carries a raised printing surface in the form of a numeral or a symbol (in this case one facet carries a decimal point). One of the facets is blank, however, so that in the position (the home position) where that particular facet is aligned with the paper, no impression will be left. The print facets of the rightmost print wheel 501*n* comprise various function symbols such as an equal sign and plus and minus signs, rather than numerals. The idler bank 376 is mounted on a shaft 377** which is carried by the frame members.

The entire process of setting up the print wheels 501, resetting the storage gears **351*a*...351*n*, returning the carriage 340 to its home position, and printing out the digits set up in the print wheels is controlled by the main shaft 344 of the terminal, primarily through two star wheel drives 378 and 379 (FIGS. 3,15,18 19) mounted on the left end of the main shaft 344. For each main shaft cycle, the main shaft 344 undergoes one complete revolution under the control of a single cycle spring clutch 380 (FIG. 4) which may be identical to the single cycle spring clutch which controls the decoder shaft 307. The main shaft cycle, initiated by a signal to the main shaft clutch control electromagnet 114, is divided into three periods each of which constitutes approximately one-third of the total cycle. During the first third of the main shaft cycle (see FIG. 14), the carriage frame 335 is rocked rearward to its output position 347 so that the bank of storage gears 351 is in a driving position with respect to the print wheels and in a driven position with respect to a reset gear bank 381 (FIGS. 5, 15, 15*a*, and 18), whereby rotation of the reset gear bank transfers the contents of the storage gears 351 into the print wheels 501**.

During the second third of the main shaft cycle, the carriage frame 335 is rocked back to its forward or input position 346, and the carriage 340 is returned to its rightmost, or home, position ready for entry of the digits of a new number. In addition, during the second third of the main shaft cycle, the printing operation takes place.

Finally, during the last third of the main shaft cycle, the print wheels 501 are cleared and reset by the reset gear bank 382 to their home positions, defined as that position where the blank type facet of each print wheel is aligned with the paper, so that nothing will appear upon printout.

Figure 18:
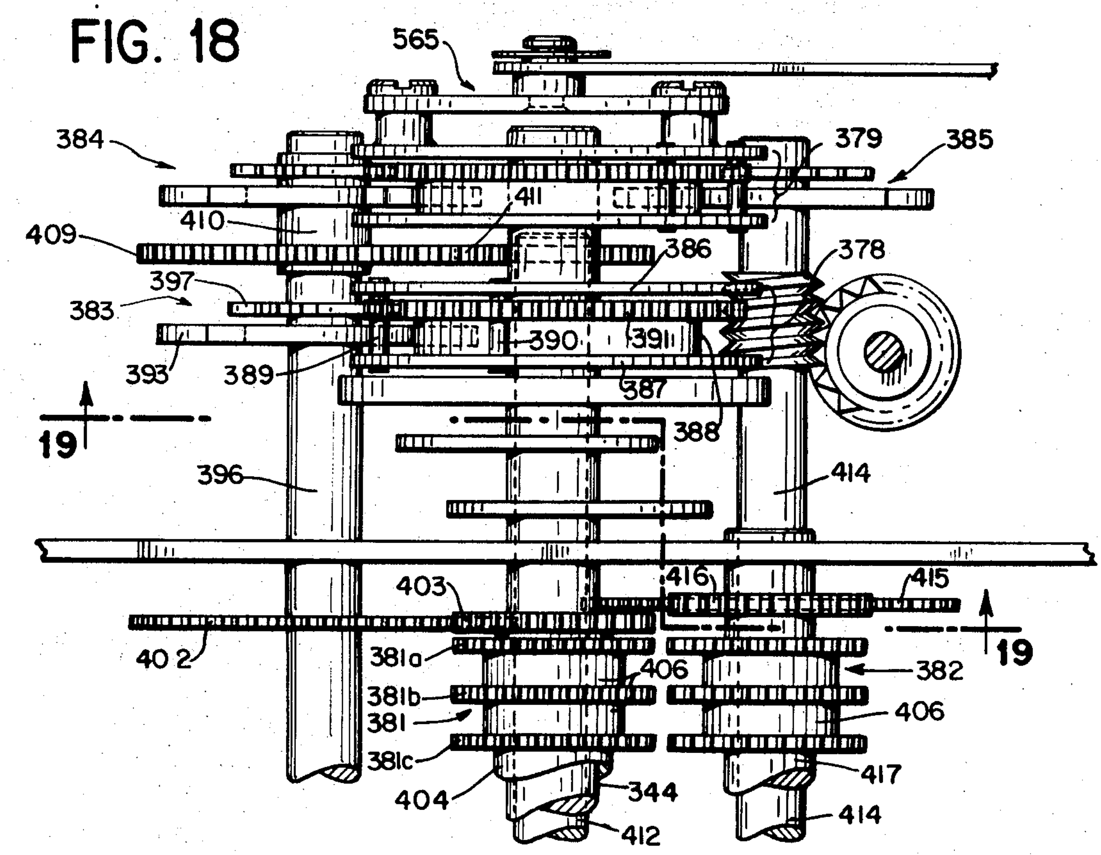
FIG. 18 is a plan view showing certain drive mechanisms.
Figure 19:
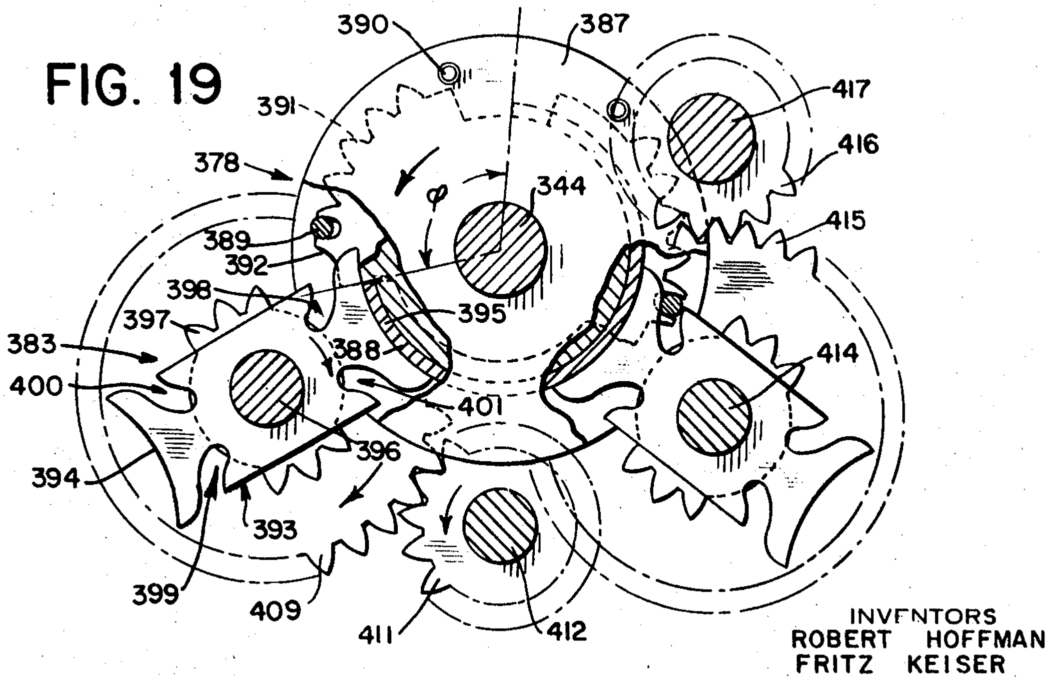
FIG. 19 is a sectional view partly broken away taken along the plan indicated by the line 19–19 of FIG. 18.

As previously stated, the timing and control mechanism for all of the above-described operations comprises basically two star wheel drives 378 and 379 mounted on the main shaft 344 (FIGS. 18 and 19). The star wheel drive 378 engages the star wheel 383 during the first third of the main shaft cycle, and the star wheel drive 379 engages the star wheels 384 and 385 in sequence during the second and final thirds, respectively, of the main shaft cycle. Since each of the star wheels and drives function in basically the same manner, their operation will be explained with respect to the drive 378 and its driven star wheel 383.

The star wheel drive 378 includes two parallel circular plates 386 and 387 mounted on the main shaft 344. A locking rim 388 of constant radius is disposed between the plates 386 and 387 and extends through an arc of less than 360°. Interiorly of the angle 100 formed by the open segment of the locking rim 388 are mounted an acceleration pin 389 and a deceleration pin 390 each pin extending between the plates 386 and 387 parallel to the main shaft 344. Also mounted on the main shaft 344 and extending through the open segment (Φ) of the locking rim 388 in a gear segment 391, part of which forms a U-shaped bracket 392 about the pin 389 to fix the gear segment 391 with respect to the other elements of the star wheel drive 378. The corresponding star wheel 383 driven by the star wheel drive 378 includes a locking member 393 having two oppositely disposed camming surfaces 394 and 395, each of which is shaped concavely to cooperate with the locking rim 388. Moreover, the shaft 396 on which the star wheel 383 is mounted must be spaced from the main shaft 344 a distance such that the camming surface 394 and 395 ride upon the locking rim 388 during that portion of the rotation of the main shaft 344 when one of them is engaged with the locking rim 388. Also disposed on the shaft 396 is a gear segment 397 having teeth disposed to coact with the teeth of the gear segment 391 in the star wheel drive. The locking member 393 has two acceleration slots 398 and 399 and two corresponding deceleration slots 400 and 401.

As the main shaft 344 begins to rotate, the locking rim 388 cooperates with the camming surface 395 to lock the star wheel 383 against rotation. As the acceleration pin 389 moves into the acceleration slot 398, the camming surface 395 is far enough past the locking rim 388 so that the star wheel 383 can be accelerated by the acceleration pin to an angular velocity at which corresponding teeth of the gear segments 391 and 397 are traveling at the same velocities, so that the star wheel 383 is driven as a gear from the main shaft 344. The star wheel accelerates at a constant rate from standstill because the acceleration slots 398, 399 (and the deceleration slots 400 and 401) are formed as cycloids. As the deceleration pin 390 moves into the deceleration slot 400, the star wheel 383 will correspondingly be decelerated back to zero angular velocity, at which point the cam surface 394 engages the locking rim 388 against further rotation of the star wheel 383.

Accordingly, each star wheel undergoes 180° of revolution for each full revolution of the main shaft 344, and the fraction of the main shaft cycle during which the star wheel rotates is determined by the relative diameters of the gear segments (e.g., 391 and 397) on the drive and star wheels, respectively, and the placement of the acceleration and deceleration pins and their corresponding acceleration and deceleration slots.

First Third-Register Gear Bank Reset

Figure 5:
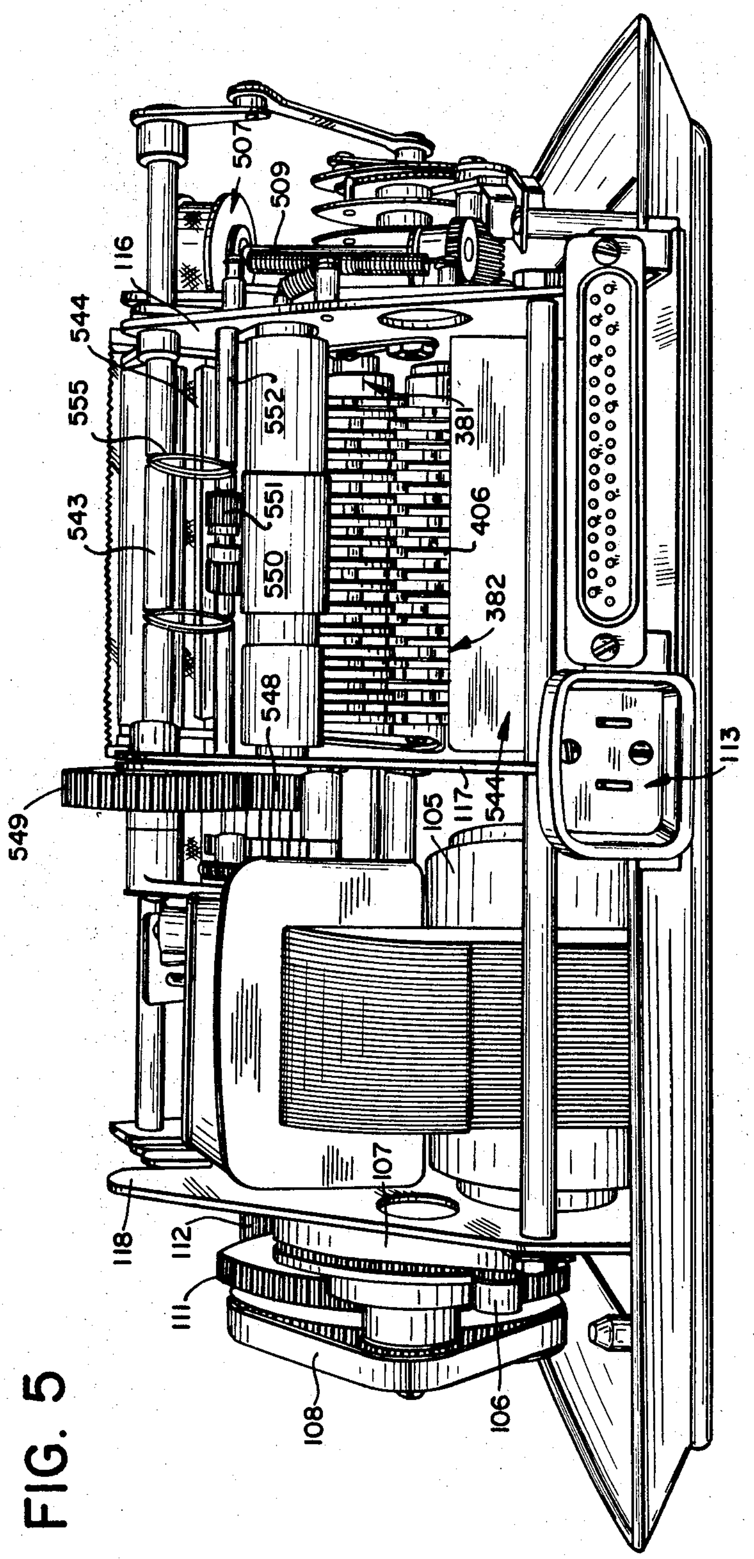
FIG. 5 is a rear perspective view of the terminal showing particularly the electrical power inlet, outlets for the binary coded electrical signals and part of the printout section.
Figure 6:
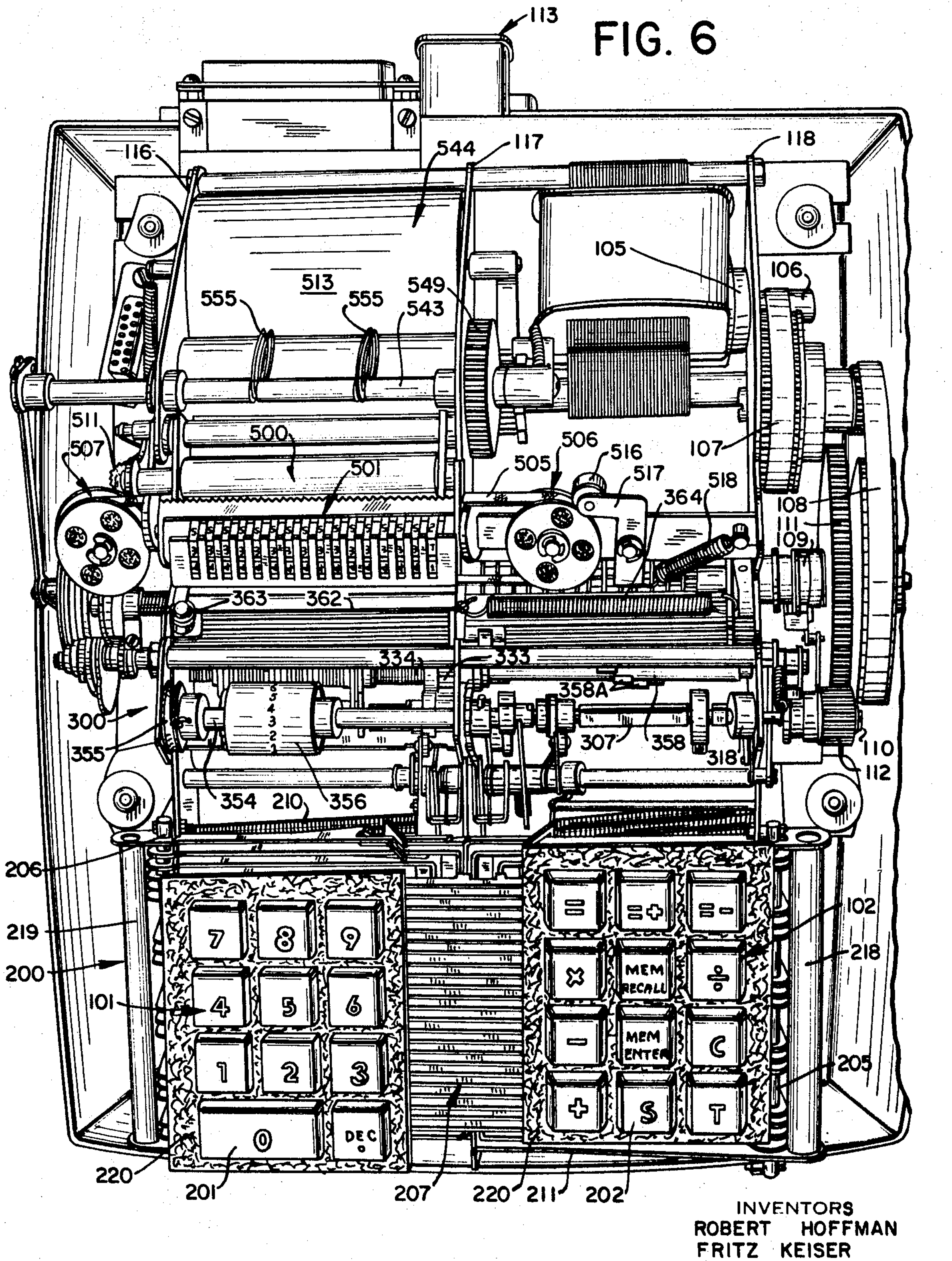
FIG. 6 is a plan perspective view of the terminal showing some detail not shown in FIG. 2.

During the first third of the main shaft cycle, the star wheel drive 378 engages the register carriage reset control star wheel 383, driving the shaft 396 and the gear 402 mounted on it through 180°. The gear 402 meshes with a drive gear 403 one-half its diameter which is mounted on a sleeve 404. The sleeve 404 rides on but is not otherwise connected to the main shaft 344, and upon it are mounted a number of gears 381*a*...381*n* comprising the register reset gear bank 381 (FIG. 5).

As illustrated in FIG. 15, each of the gears 381*a—n* has eleven teeth distributed evenly adjacent a flat portion 405 (FIGS. 5 and 15*a*), and the gears are separated by integrally formed spacers 406. Each of the gears 351*a—n* of the converter gear bank is identical to the gear 351*a* shown in FIG. 20. One tooth 407 of the gear 351*a* is a half-tooth, that is, it extends for only half the width of the gear wheel leaving a space 408. Each of the reset gear wheels 381*a—n* meshes with a corresponding register gear wheel 351*a—n*, and is aligned with only the portion thereof containing the space 408.

With this arrangement, to reset the register gear bank 351, the reset gear bank 381 is rotated through one full revolution (as described above). The flat portion 405 allows free rotation of the gear bank 351 in the position (of the former) indicated. Rotation of the reset gear bank 381 drives the register gear bank 351 to that point where the reset gears engage the respective spaces 408 in the gear wheels 351, in which positions the latter are reset and cease to rotate.

Figure 21:
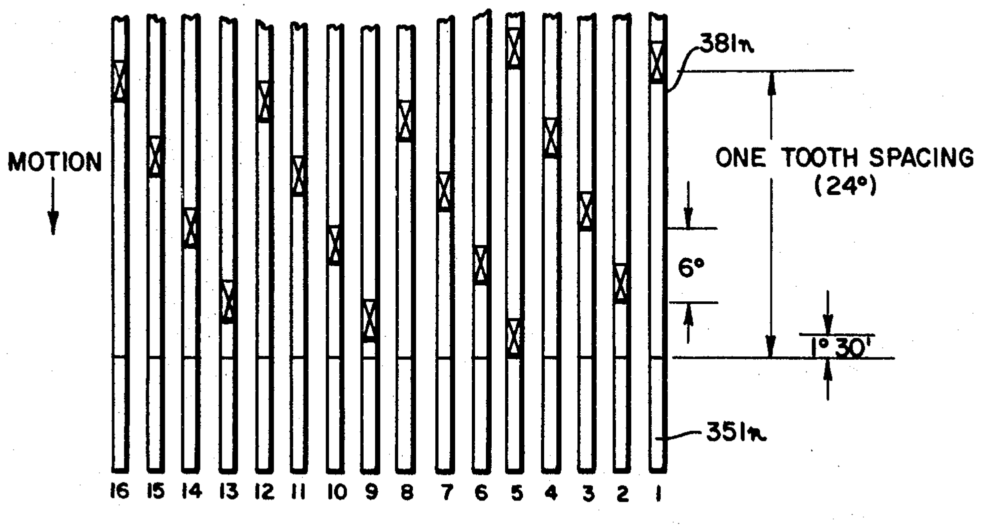
FIG. 21 is a schematic illustration of the distribution of the teeth in the reset gear bank.

If corresponding teeth of all the gears in the reset gear bank 381 were aligned, then rotation thereof would begin resetting all of the storage gears in the register 351 at the same time, thereby placing an undue load on the drive motor and interfering with the smooth operation of the device. Therefore, the teeth of all of the gears 381*a—n* are staggered so that they mesh in an ordered sequence, picking up the load smoothly. Where, as indicated in FIG. 21, the spacing between two successive teeth of each gear 381*a—n* is 24° and 16 gear wheels must be reset (i.e., $n$=16 ), then the lag between any two teeth can be 1½° The total lag is distributed as shown in FIG. 21. In this way, the load of the reset gear bank 381 is distributed in time and does not impose a sudden load upon the motor. The spacers 406 (FIG. 5) properly space the gear wheels 381*a—n* and align them so that they mesh only with those respective portions of the register gears 351 corresponding to guide spaces 408.

When the frame 335 is moved to its rearward, or output, position a cam (not shown) mounted on shaft 396 actuates a locking blade mounted on the frame of the device, which locking blade constitutes a horizontal blade 340C disposed, in its locked position, beneath the ledge 340′ formed in the downward extension of the carriage 340. The purpose of this locking blade is to lock the frame 335, and particularly the end thereof away from the arm 341 (FIG. 14) which controls the position of the frame, in its rearward position of the frame, in its rearward position 347 so that transfer of the register contents to the print wheels can take place.

As the shaft 396 rotates during each first third of the main shaft cycle to reset the register 351 and transfer its contents into the gear bank 381, immediately before such transfer the aforementioned cam (not shown) engages the locking blade 340C with the ledge 340′. This rigidly supports the frame 335 during the entry operation. Subsequently the horizontal blade 340C is permitted by the aforementioned cam to return to its initial position before the shaft 396 ceases to rotate.

Second Third-Register Carriage Return

During approximately the next, or second, third of the main shaft cycle, only the carriage return control star wheel 384 is engaged, driven by the star wheel drive 379. The star wheel 384 is mounted along with an adjacent gear 409 on a sleeve 410 which rides on the shaft 396 but is not otherwise engaged with it. The gear 409 is in mesh with a drive gear 411, half its diameter, which is mounted on and drives a shaft 412 which carries a register carriage return worm 413 (FIG. 16) The two star wheel drives 378 and 379 are spaced apart on the main shaft 344 to provide space for the gears 409 and 411. During this second third of the main shaft cycle, the worm 413 completes one full revolution, acting upon the cam follower 353 to return the carriage 340 to its rightmost, or home, position. The register gear bank 351 (which was returned to its input position 346 before being returned to its home position) can now receive the digits of the next number input of the device.

As the carriage 340 is returned to its home position, the escapement drum 358 rotates to its corresponding home position. As the cam surface 365 moves from each tooth on the drum 358 to the next, the tension in the spring 364 (which is maintained substantially constant at all times) acts on the windup drum 355 to turn the shaft 354, thereby imparting the necessary restoring torque to the escapement drum 358. In this way, the order position indicator drum 356 is returned to zero.

Final Third-Print Wheel Reset

The third portion, or third, off the main shaft cycle is controlled by the star wheel 385 driven by the star wheel drive 379. Because the carriage return control star wheel 384 and the print wheel reset control star wheel 385 are driven from the same star wheel drive 379, the delay between their respective actuations is determined by the angle between the shafts 396 and 414 on which they are mounted with respect to the main shaft 344.

Figure 15A:
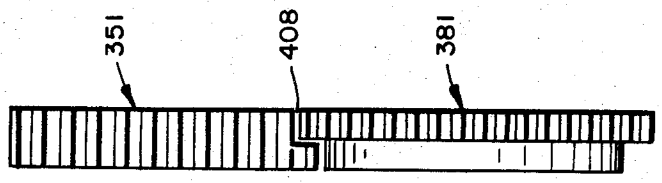
FIG. 15*a* is a cross-sectional view showing the relationship of a gear in the converter gear bank in its home positioning with a gear of the reset gear bank.
Figures 27, 28, 32:
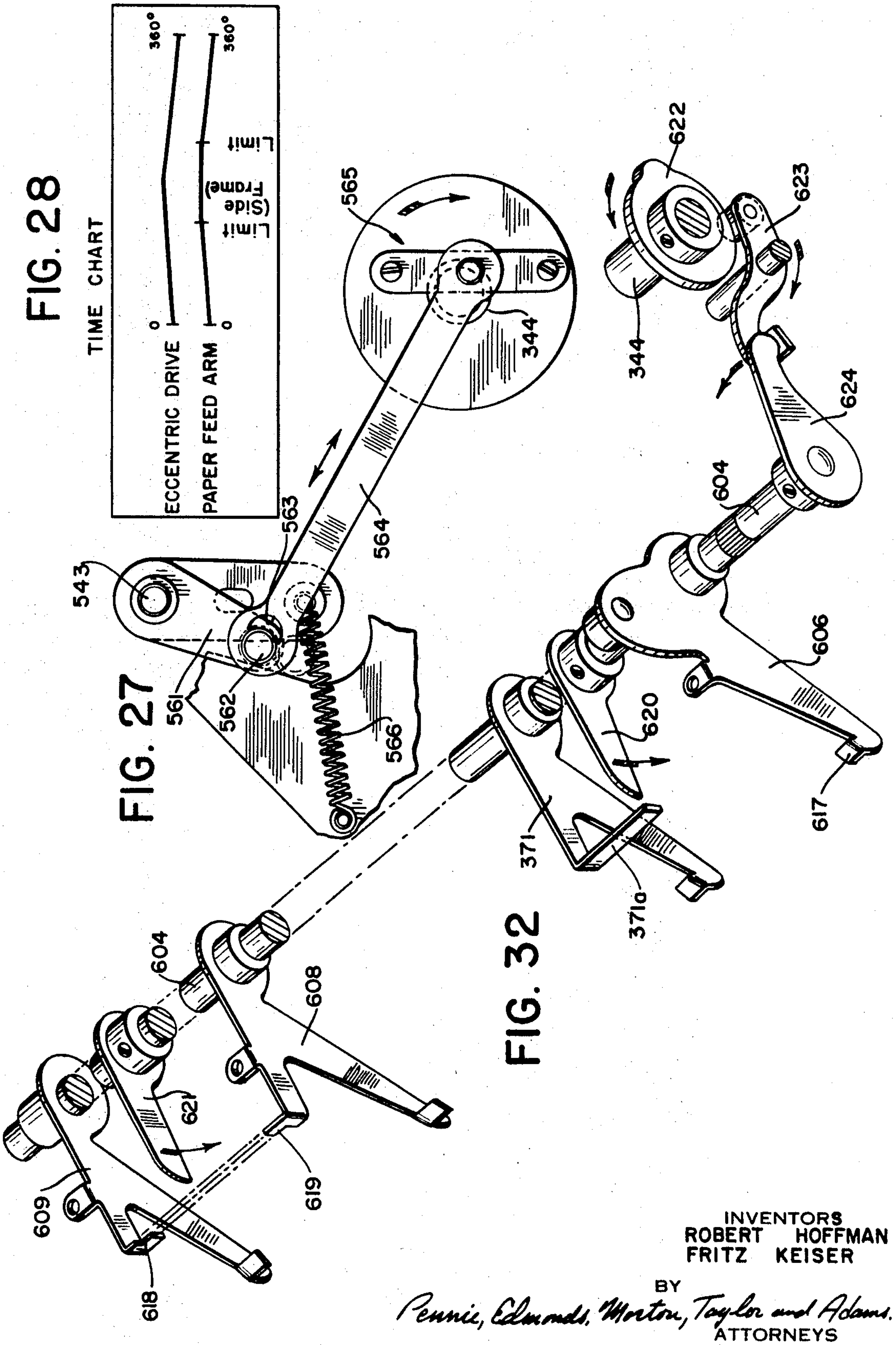
FIG. 27 is a partial side elevation of the drive mechanism for the paper feed.
FIG. 28 is a timing diagram for the operation of the paper feed mechanism.
FIG. 32 is a partial exploded view, in perspective, showing part of the mechanism shown in FIG. 31.

The print wheel reset control star wheel 385 is mounted on the shaft 414 through which it drives a gear 415 in mesh with a drive gear 416, half its diameter, rotatable on a shaft 417. The shaft 417, which undergoes one full revolution during each main shaft cycle, has mounted on it the print wheel reset gear bank 382. The latter may be identical to the register reset gear bank 381, described above, and resets the print wheels 501 through an idler bank 376 carried by the shaft 377. The gear wheels comprising the idler bank 376 are identical (except in size) to those of the register gear bank 351) (see FIG. 20), and the gear wheels of the print wheel reset gear bank 382 mesh with the gears of the idler gear bank 376 in the portions of the latter having spaces identical to the space 408 (FIGS. 27 and 15*a*). When the teeth of the gears 382 mesh with the spaces in the gears 376, the blank print facets of the print wheels are aligned with printout, as shown in FIG. 15. A rack 418 (FIG. 15) mounted on the frame of the device carries spring loaded detent plungers 419 coacting with each gear wheel in the idler bank 376 for aligning and preventing overshoot of the latter. After thus resetting the print wheels, the main shaft 344 completes a full revolution and is brought to a stop by engagement of the clutch control cam 420 (identical to the cam 309 of the decoder shaft clutch 308) with the actuator 421. Initiation of a main shaft cycle requires energization of the clutch control electromagnet 114 to pull downward the arm 422, thereby pulling the actuator 421 out of engagement with the control cam 420.

Once the print wheels are set or are rotated to a printing position by the transfer mechanism, the contents of the print wheels are ready to be printed out on a record material. The printing operation is achieved by disposing a record material in printing relationship with the print wheels and thereafter actuating a print roller to exert a rolling pressure thereon to thus print out the contents of the print wheel on the record material.

PrintOut Section

The printout section, as briefly described before, includes in addition to the print wheel and the transfer mechanism, the aforesaid record material and a printing actuator. The record material preferably is in the form of an inked ribbon in association with a sheet material such as paper The printing actuator is advantageously a print roller rotatable about an axis and pivotally mounted on a first shaft both parallel to the axis of the print wheels. The distance between the axes of the first shaft and the print roller, plus the radius of the print roller, is slightly greater than the distance between the axis of the first shaft and the print facets, by an amount sufficient to provide rolling pressure on the paper and ribbon against the print facets. The print roller is driven by a power source which provides a reciprocating movement to the print roller, imparting a rolling pressure on the paper and ribbon aligned with the print facets in the printing position.

a. Ribbon and Ribbon Advance Mechanism

Figure 22:
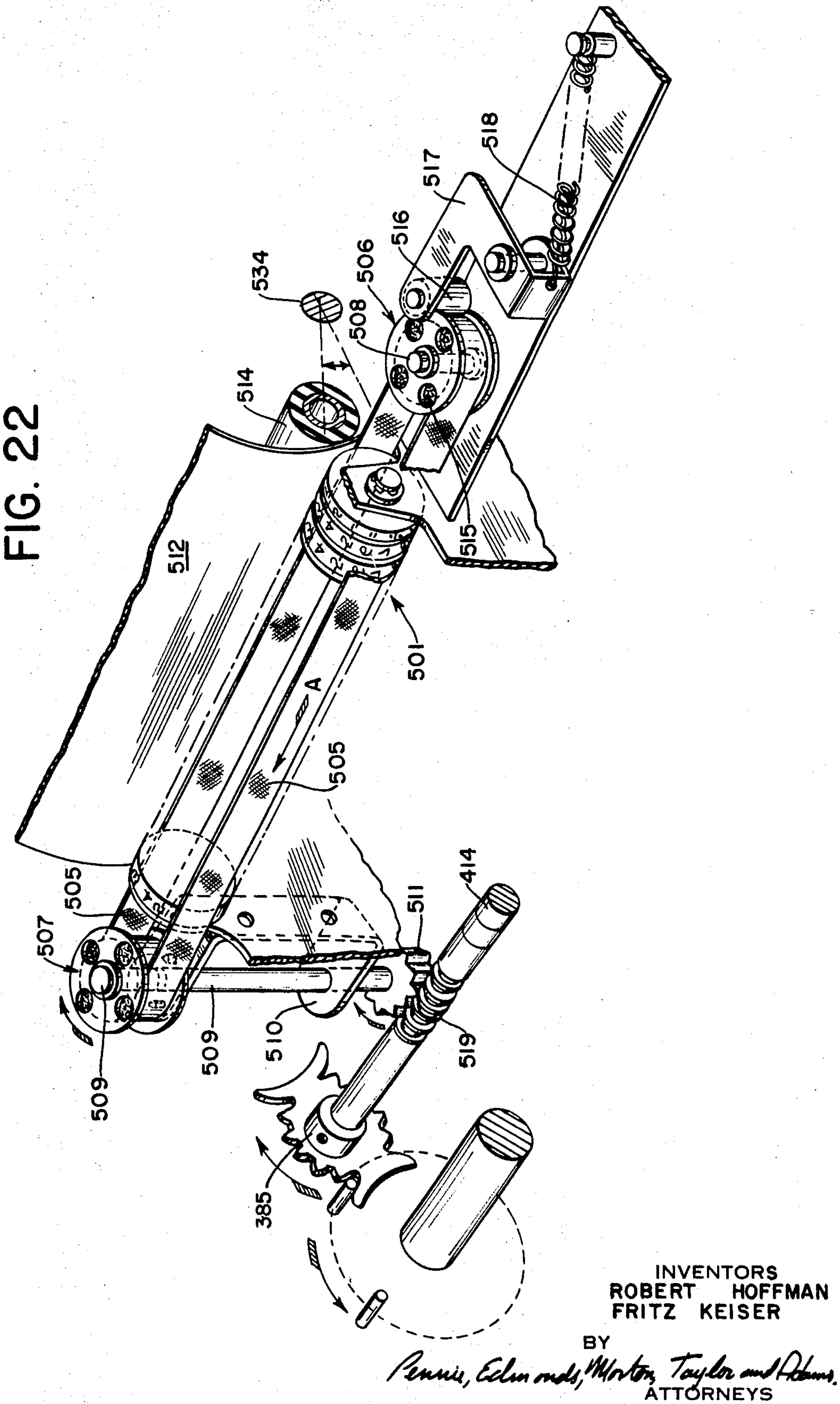
FIG. 22 is a partially perspective view of the ribbon advance mechanism.

Referring now to FIG. 22, the print wheels 501 are disposed between the two standing portions of an endless ribbon 505 carried by two rotatable spools 506 and 507. The spool 506 rotates about a shaft 508 which is fastened to the frame of the device and the spool 507 is fastened to a drive shaft 509 which is mounted in a bracket 510 attached to the frame and which carries a ribbon drive gear 511 at its lower end. A web of paper 512 extending from a paper roll 513 (FIG. 27) extends between the rear standing portion of the ribbon 505 and a print roller 514, which is formed of a slightly resilient material and in printing swings through an arc substantially in the vertical plane to press the paper and the adjacent standing portion of the ribbon 505 against a line of print facets of the print wheels 501.

The ribbon spool 506 which has a rim for guiding the ribbon is, in the form of an ink pad 515 which transfers ink to the endless ribbon 505. The ribbon is made of a material (e.g. woven nylon) such that the ink picked up from the ink pad 515 is distributed throughout the ribbon by capillary action during the same time between its inking and its application in printing. A roller 516 mounted on an arm 517 presses the ribbon against the ink pad to assure adequate and even distribution of the ink on the ribbon 505. The arm 517 is spring loaded against the ink pad 515 by a spring 518 anchored on the frame. The spool 507 is formed of a somewhat absorbent material so as to blot any excess ink out of the ribbon as it passes over it and also to aid in evenly distributing the ink in the ribbon.

The drive gear 511 on the ribbon drive shaft 509 meshes with a worm 519 provided on the shaft 414 which is driven by the star wheel 385, thereby advancing the ribbon in the direction of the arrow A, preferably by an amount slightly greater than one character in width, once during each main shaft cycle. By advancing the ribbon in the direction of the arrow A, sufficient time is allowed for complete ink distribution throughout the ribbon, and the spool 507 has a chance to blot any excess ink before the ribbon pa sses between the print wheels and the print roller.

b. Printing Mechanism

Figures 23, 24:
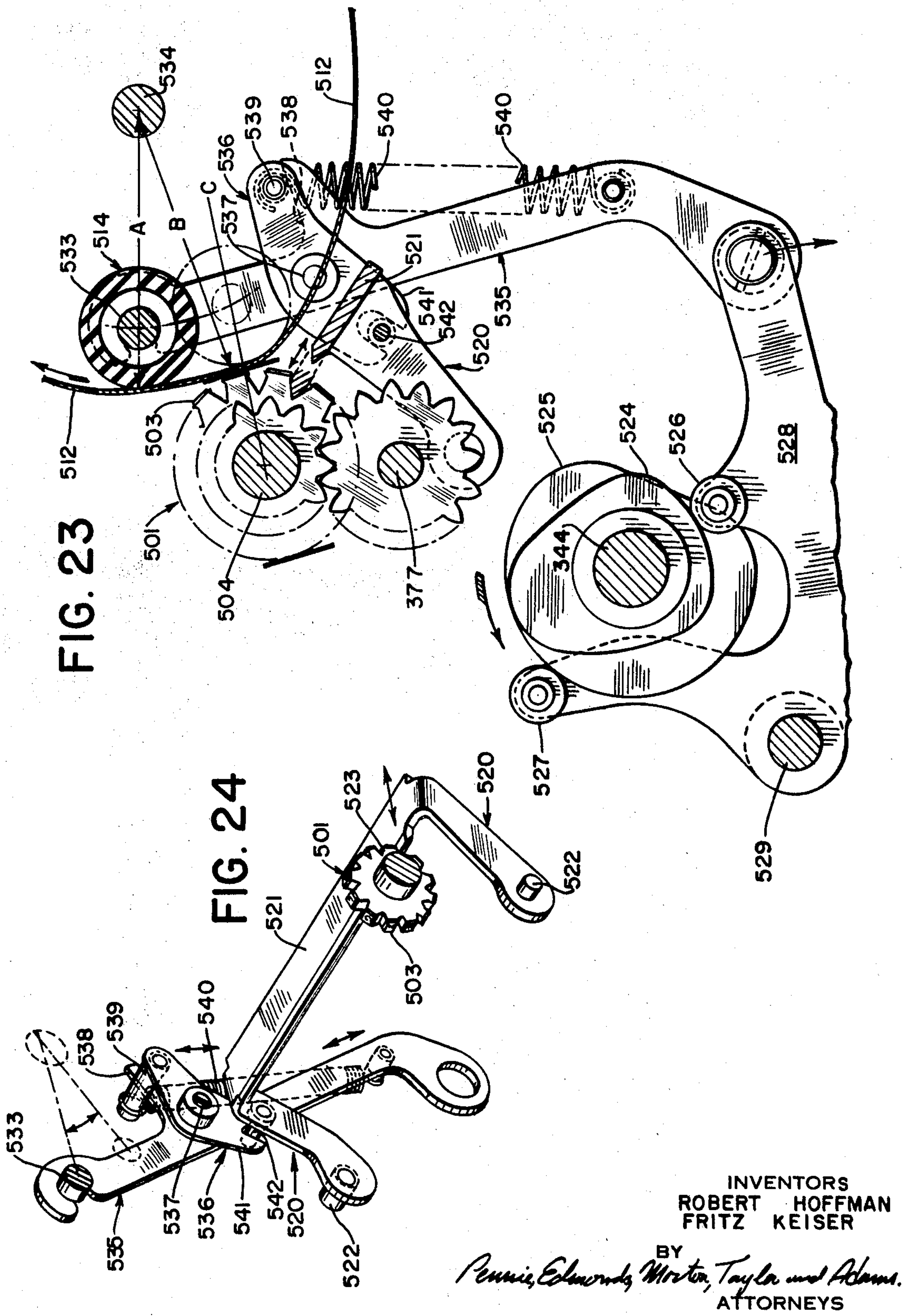
FIG. 23 is a partial sectional view of the drive mechanism for the printing unit.
FIG. 24 is a partial perspective of the aligning mechanism for the printing unit.

Print wheel alignment and printing are controlled by a common actuating mechanism, shown in FIGS. 23 and 24. The print wheel aligner bar 520 comprises a horizontal blade 521 with a V-shaped forward edge pivotable in the vertical plane on two arms which are mounted in the frame elements 116 and 117 by means of pins 522. The blade 521 is disposed such that it can move in and out of the V-shaped notches 523 disposed circumferentially about all of the print wheels 501 between adjacent print facets 503. After the print wheels have been set up by resetting the register gear bank 351 to zero, and at the outset of the printing operation, the aligner bar 520 is moved upwardly so that the blade 521 moves all the way into the V-shaped slots 523 thereby aligning the print facets 503 of all of the print wheels 501 and locking them from further action. After printing has taken place, the aligner bar is moved backwards so that the print wheels are again free to rotate.

Movement of the aligner bar 520 and the print roller 514 is governed by a pair of complementary drive cams 524 and 525 mounted on the main shaft 344. The complementary cams 524 and 525 act upon respective cam followers 526 and 527 carried by a double-armed rocket member 528 pivoted about a shaft 529 fixed to the frame.

As shown in FIG. 14, the print roller 514 is mounted in a bracket 530 which includes two rigidly aligned arms 531 and 532 carrying a shaft 533 on which the print roller 514 is mounted. The bracket 530 is pivotally mounted on a shaft 534 between the frame member 116 and 117 such that the distance from the center of pivot shaft 534 to the outer circumference of print roller 514 is slightly greater than the distance from the former to the print facets 503, to provide adequate pressure between the print roller and the print facets for a good impression.

The print roller 514 is normally maintained above the print wheels 501. When printing occurs, the print roller 514 is swept downward across the type facets of the print wheels 501 so that it rolls across the type faces leaving a clear and well delineated image. Printing occurs during the last portion of the downward travel of the print roller 514 and the beginning of its upward return movement. It is important that the print roller not travel so far downward as to disengage from the print facets before its upward return stroke; this prevents slippage between the paper and the print facets, assuring a clear image on the paper.

The print roller 514 is actuated by an actuating member 535 connected between the print roller shaft 533 and the double-armed member 528 and is free to pivot with respect to both of them.

As the main shaft 344 rotates, both of the complementary cams 524 and 525 are at all times in contact with the respective cam followers 526 and 527. During approximately the first and last thirds of the main shaft cycle, the cams 524 and 525 are of constant radius with respect to their followers so that the arm 528 is stationary and the print roller 514 remains in its uppermost position. During the second third of the main shaft cycle the same 524 increases in radius forcing the arm 528 and consequently the print roller 514 downward. At the same time, the cam 525 decreases in radius (with respect to the cam follower 527) at a rate corresponding to the increase in radius of the cam 524 (with respect to the cam follower 526), so that the cams always remain in contact with their respective followers. After the print roller 514 has reached the bottom of its travel and has swept across the preselected print facets 503, the cam 525 begins to increase in radius with respect to the cam follower 527 while the cam 524 begins to decrease correspondingly in radius with respect to the cam follower 526 thereby forcing the arm 528 upward and returning the print roller 514 to its home position. Positive action is thus provided both for the downward and upward movement of the print roller 514.

To control the action of the aligner bar 520 and to synchronize it with the action of the print roller 514, the former is controlled by a rocker arm 536.

The rocker arm 536 is pivoted about a pin 537 mounted on the frame of the device. The actuating member 535 includes a ledge 538 extending rearwardly at approximately the same level as the pin 537 so that a pin 539 extending from the rocker arm 536 is in a position to rest on the ledge 538. A spring 540 under tension is mounted between the pin 539 and the lower portion of the member 535 so as to urge the pin 539 downwardly against the ledge 538. The forward end of the rocker arm 536 is formed as a fork 541 which cooperates with a pin 542 extending from the aligner bar 520 (FIG. 24).

The print wheel and aligner bar drive mechanisms cooperate in the following manner. The print roller begins in its uppermost, or home, position at which time the pin 539 rests on the ledge 538, the rocket arm 536 thereby being pivoted counterclockwise (as viewed in FIGS. 23 and 24) to hold the aligner blade 521 out of engagement with the V-shaped slots 523 in the print wheels. As the arm 528 moves downward during the second third of the main shaft cycle, it drives the print roller 514 downward and at the same time lowers the ledge 538 permitting the spring 540 to pivot the rocker arm 536 clockwise about the pin 537 thereby driving the blade 521 into engagement with the print wheels. This particular type of action in which the blade 521 is urged into the V-shaped slots 523 by a spring rather than by positive mechanical action is desirable to prevent the aligning action of the relatively sharp blade 521 from cutting into and thus destroying the shape of the V-shaped slots 523. When the arm 528 again moves upward on the return printing stroke, the ledge 538 lifts the rocker 536 against the action of the spring 540 thereby removing the blade 521 from engagement with the print wheels 501. The above-described elements are positioned and dimensioned such that the print wheels are fully aligned before being contacted by the print roller 514 and remain fixed by the aligner bar 520 until completely out of contact with the print roller 514.

To provide a clear printout, it is necessary to limit the downward pivotal movement of the print roller to a position so that a plane including the axis of the print roller and the rotating axis of the print wheel shaft substantially intercepts the lower surface of the print facets in the printing positions. This position is shown in FIG. 23. Reciprocating the print roller passing this position has a tendency to print doubles or otherwise blur.

c. Paper Feed

Figures 25, 26:
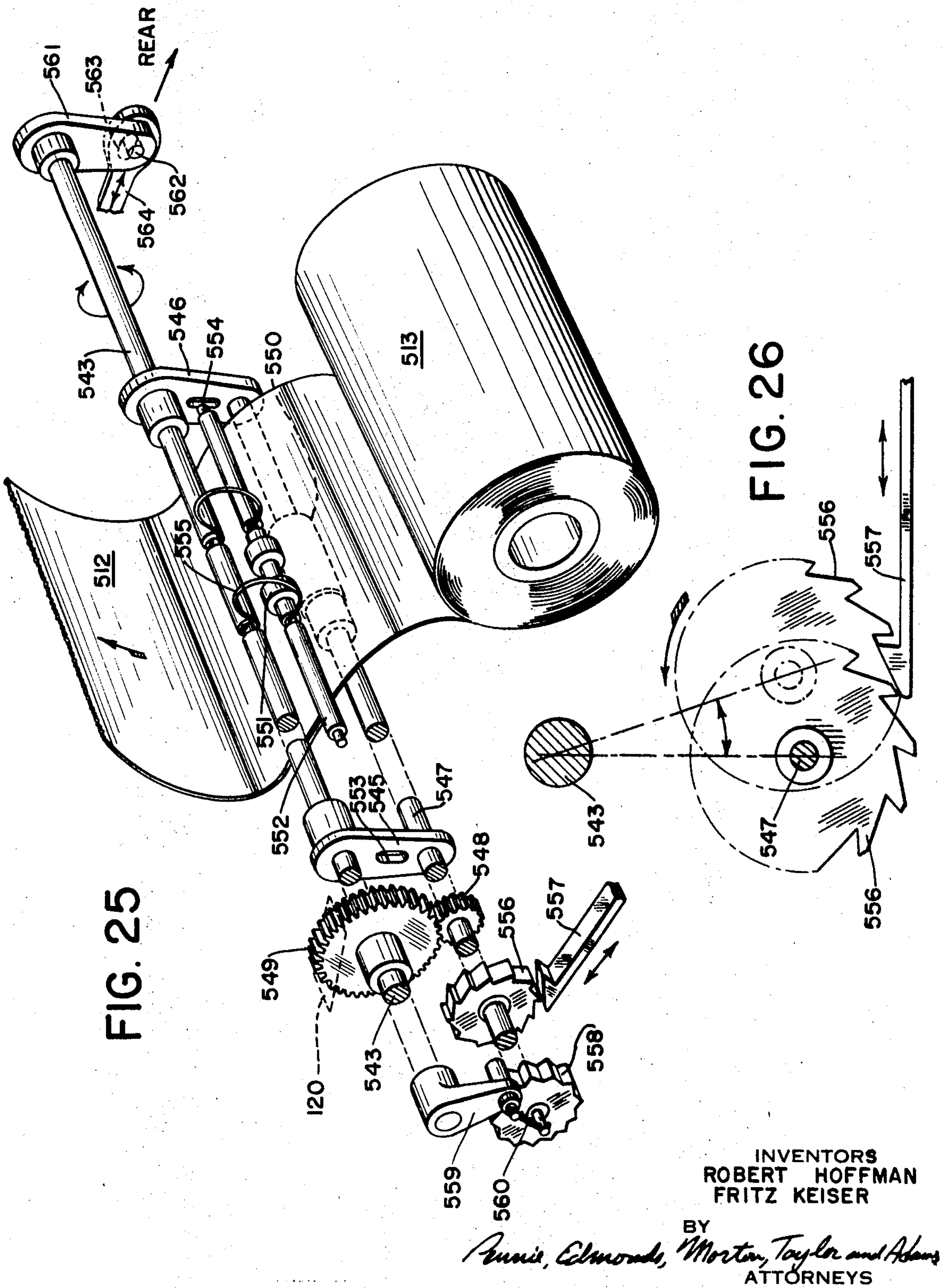
FIG. 25 is a partial exploded view, in perspective, of the paper feed mechanism.
FIG. 26 is a partial sectional view, illustrating part of the paper feed mechanism shown in FIG. 25.

The path of the paper 512 which is interposed between the type facets 503 and the ribbon 505 (in front of the paper) and the roller 514 (behind it), can be seen from FIGS. 23 and 25.

As shown in FIG. 1, the paper 512 is visible through a window 119 in the cover 100 of the device where the output numbers are displayed. The printing position (that is, the position of a portion of the paper 512 when it is contact by the print wheels) is, however, the equivalent of two index (paper advance) spaces below the level of the window 119; therefore, after each printout operation, the paper must be indexed upward two spaces so that the number just printed will appear in the window 119. In order that successive numbers on the paper will be only one vertical (index) space apart, it is therefore necessary to index the paper downward one space before each printout operation after which it is moved up two spaces.

This is accomplished by the paper feed mechanism shown in FIG. 25 as viewed from the rear of the device. A paper feed control shaft 543 is mounted between the frames 116 and 117 as shown in FIG. 2. The paper roll 513 rests in a cavity 544 (FIG. 5) in the rear of the device from which the paper 512 passes forward below the feed control shaft 543 then passing behind the window 119 and upward out of the device. A pair of arms 545 and 546 are fastened to the shaft 543 on opposite sides of the paper 512 and extend downwardly to carry a further shaft 547 substantially parallel with the feed control shaft 543. The arms 545 and 546 are fastened to and rotate with the shaft 543 but the shaft 547 is rotatable independently of them by a gear 548 in mesh with a larger gear 549 rotatably mounted on the shaft 543 and which extends through an opening 120 in the cover of the device. The shaft 547 carries a friction roller 550 which cooperates with a friction roller 551 carried by a shaft 552 which rides freely up and down in a pair of slots 553, 554 extending vertically in the arms 545 and 546. The shaft 552 is forced downwardly by a pair of loop springs 555 which are fastened to the feed control shaft 543 so that the friction rollers 550 and 551 are urged together.

The paper 512 passes between the friction rollers 550 and 551. A ratchet wheel 556 is mounted on the shaft 547 outwardly of the gear 548 and cooperates with a flexible ratchet member 557 is mounted on the frame. Outwardly of the ratchet wheel 556 a detent gear 558 is mounted on the shaft 547. A detent arm 559 is rotatably mounted on the feed control shaft 543 to cooperate with the detent gear 558, in the manner shown, and is spring biased toward the gear 558 by means of a spring 560 held under tension between the detent arm 559 559 and the shaft 547.

A crank 561 having a pin 562 extending horizontally from its lower portion is fixed to the feed control shaft 543. The pin 562 rides in a slot 563 in a feed control arm 564 which reciprocates to drive the paper feed mechanism in the following manner.

At the outset, the feed control arm 564 is in its forward position (toward the front of the device). Before printout occurs, the arm 564 moves toward the rear of the machine rotating the feed control shaft 543 counterclockwise (in FIG. 25) and thereby indexing the paper 512 downward one space so that it is properly aligned for printing. During this step, the arms 545 and 546 rotate the entire paper feed mechanism about the feed control shaft 543. When the feed control arm 564 reaches its rearmost position, the ratchet wheel 556 has depressed the ratchet member 557 and has engaged it at approximately the rearmost point in its swing, as shown in FIG. 26. The shaft 547 is prevented from rotating during this portion of the feed mechanism cycle with respect to the arms 545 and 546 by the locking action of the detent gear and arm 558 and 559.

After printing has taken place, the feed control arm 564 again moves toward the front of the device rotating the feed control shaft 543 clockwise. This movement along would index the paper 512 upward one space returning it to its previous position. However, the ratchet wheel 556 has engaged the ratchet member 557 so that clockwise movement of the shaft 547 about the feed control shaft 543 causes a further rotation of the shaft 547 with respect to the arms 545 and 546. This turns the friction roller 550 to advance the paper 512 one additional index space for a total of two upward index spaces on the return stroke of the feed control arm 564. Rotation of the shaft 547 with respect to the arms 545 and 546 is permitted on the return or forward stroke of the feed mechanism because the torque applied to it by the ratchet member 557 through the ratchet wheel 556 overcomes the resistance supplied by the detent arm and gear 559, 558.

As shown in FIGS. 27 and 28, the feed control arm 564 is operated by an eccentric mount 565 provided on the main shaft 344. A spring 566 biases the arm 546 toward the rear of the device so that the lost motion slot 563 provides a dwell period during which the arms 545 and 546 remain in their rearmost position. This dwell period is indicated in FIG. 28 in which the top graph denotes the position, as a function of the main shaft angle of rotation, of the feed control arm 564 while the lower graph similarly shows the rotation of the feed control shaft 543 as a function of the same variable.

6. Main Shaft Cycle Timing

Figure 29:
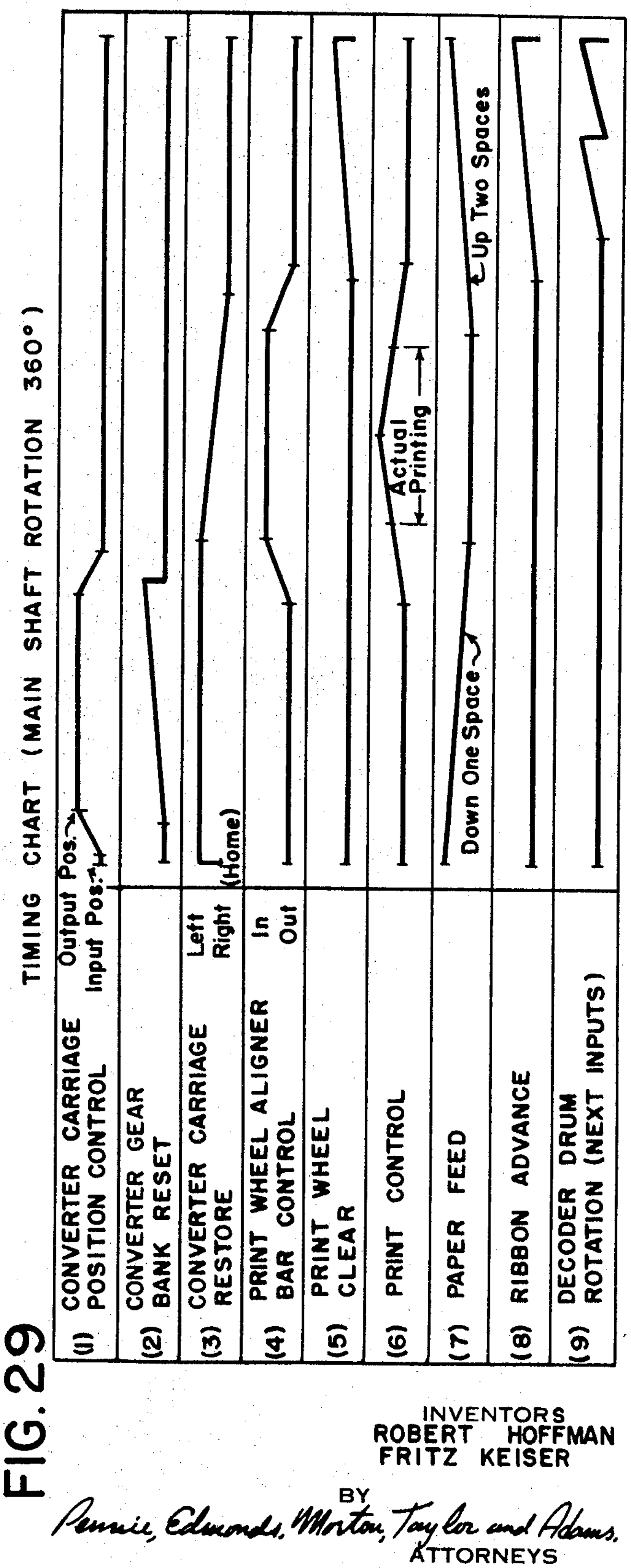
FIG. 29 is a timing chart illustrating the main shaft cycle.

The overall timing of and cooperation among the printing and clearing mechanisms, the ribbon advance mechanism, and the paper feed mechanism are indicated in FIG. 29 (graphs 1—9), all as functions of the rotational angle of the main shaft 344 during a main shaft cycle.

Immediately after the main shaft 344 begins to rotate, the rocker cam 343 acting upon the cam follower 342 rocks the register carriage from its input position 346 to its output position 347 in which the gears comprising the register gear bank 351 are aligned and meshed with the idler gears 376 (Graph 1). As soon as the register gear bank 351 is in mesh with the idler bank 376, the register reset gear bank 381 is actuated by the star wheel 383 to transfer the contents of the register gear bank 351 into the print wheel bank 501 and to reset the register gear bank 351 to zero (Graph 2).

At this point, further rotation of the rocker cam 343 permits the carriage 340 to return to its input position 346 (Graph 1). At the same time, rotation of the eccentric mount 565 causes the print wheel aligner bar 520 (Graph 4) to engage, align, and lock the print wheels 501. Meanwhile, the paper feed mechanism has indexed the paper down one space (Graph 7). Just after the register carriage 340 is returned to its input position the carriage return worm 413 driven by the star wheel 384 from the star wheel drive 379 returns the carriage 340 to its home, or rightmost position (Graph 3).

As soon as the paper feed mechanism (Graph 7) has indexed the paper downward one space and the print wheels 501 have been locked (Graph 4) the print roller 514 (which has at this point already begun its downward motion (Graph 6) is rolled down across the type facets 503 and back up. As the print roller 514 completes its upward movement, the aligner bar 520 is removed from engagement with the print wheels (Graph 4), and the paper feed mechanism (Graph 7) begins to index the paper upward two spaces.

After the print wheels 501 have been unlocked, the print wheel reset gear bank 382 is driven by the star wheel 385 to reset the print wheels 501 thereby also advancing the ribbon 505 through rotation of the worm 519. As indicated by Graph 9, immediately after the carriage 340 has been restored to its home position the decoder shaft 307 (Graph 9) can begin to cycle in order to enter the next number into the unit.

Figure 30:
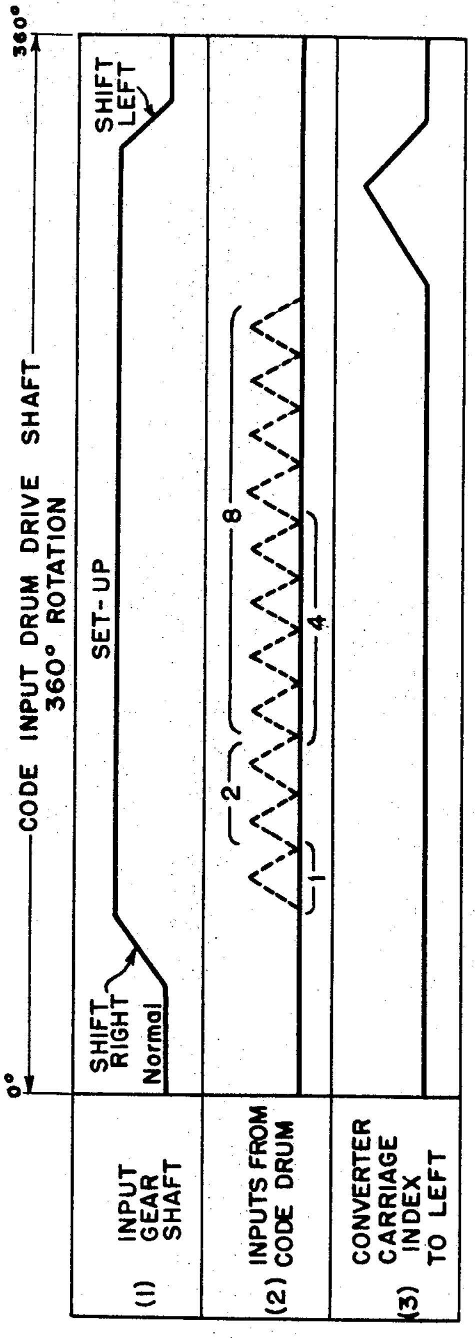
FIG. 30 is a timing chart describing the decoder shaft cycle.

FIG. 30 illustrates a decoder shaft cycle. Graph 1 shows the timing with respect to the 360° rotation of the decoder shaft 307 of the rightward shifting movement of the input shaft 320. Graph 2 illustrates the sequential engagement of the respective 1, 2, 4, and 8 code drum segments 306*a*—*d*. Graph 3 shows the subsequent leftward indexing action of the carriage 340 to engage the next decimal order to be set up.

7. Timing and Control Signal Generation

Figure 31:
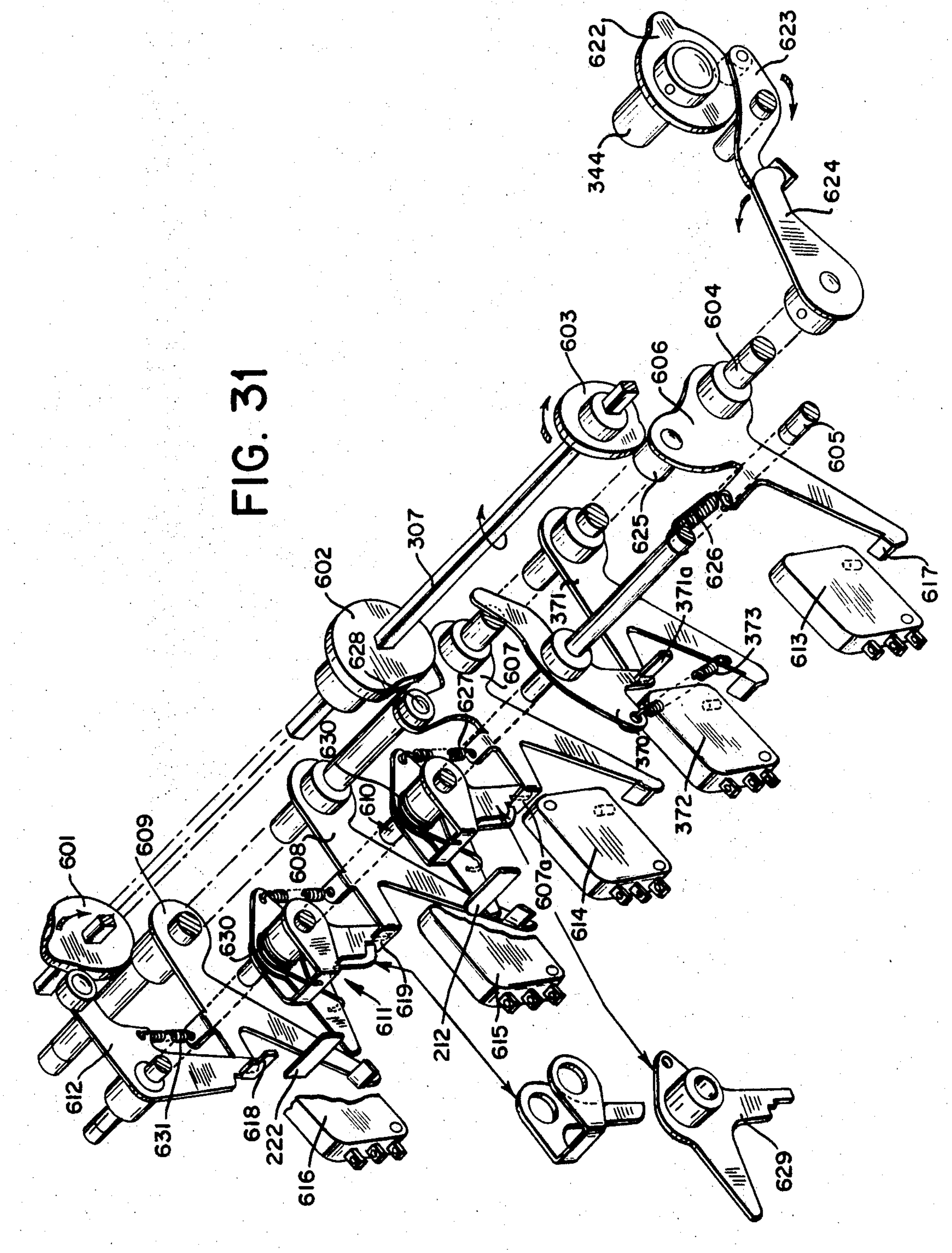
FIG. 31 is a partial exploded view, in perspective, showing control switches and their corresponding actuating mechanisms.

On the decoder shaft 307 and to the right of the code drum 306 are mounted the following timing cams FIGS. 31 and 32): a main shaft cycle cam 601, a strobe control cam 602, and a digit entry timing cam 603. On two shafts 604 and 605 are mounted switch actuating members 606, 607, 608, and 609 and corresponding latches 610, 611, and 612 for actuating respective ones of a digit entry timing switch 613, a strobe switch 614, a function switch 615, and a main cycle switch 616. Also shown is the overcapacity switch 372 and its associated actuator 371 and latch 370 described above in section 3.

Each of the switch actuating members carries a tab (for example, the tab 617 on actuating arm 606) disposed to actuate the corresponding switch when the arm is rotated clockwise. The shafts 307, 604, and 605 in FIG. 31 have been expanded. FIG. 32 in which the shaft 604 is similarly expanded illustrates more clearly the cooperation between the function and main shaft cycle switch actuating members 608 and 609 (the strobe switch actuating arm 607 is not shown). Thus the main shaft cycle and function switch actuating arms 609 and 608 carry cooperating tabs 618 and 619, respectively, which interlock as indicated in FIG. 32 to prevent actuation of the main shaft cycle switch 616 except when the function switch 615 is actuated. The actuating arm 371 and the pair of actuating arms 608 and 609 are free to rotate on the shaft 604, and they are reset, as will be explained, by means respectively of reset arms 620 and 621 which are fastened to the shaft 604. The reset arms 620 and 621 are actuated by a single-lobe cam 622 on the main shaft 344 which rotates the shaft 604 through a rocker arm 623 and a crank 624.

The digit entry switch 613 functions to generate a blocking signal to the associated computer or data processing unit to lock out digit entry during the decoder cycle. This signal is sent when the switch 613 is actuated at the beginning of each decoder shaft cycle. The decoder shaft 307 and the cams 601, 602, 603 are shown in their rest positions. As the decoder shaft begins to rotate, the single lobe on the cam 603 moves off of the cam follower 625 permitting the digit entry timing switch actuating arm 606 to rotate clockwise under the influence of a spring 626 thereby actuating the switch 613. Immediately before the end of the decoder cycle, the single-lobe cam 603 deactuates the switch 613 to remove the blocking signal thereby calling for entry of a new digit.

Operation of the overcapacity switch 372, explained in part above, is controlled by the overcapacity latch 370 and the overcapacity switch actuating arm 371 which are spring loaded together by a spring 373 as indicated. The latch 370 is controlled by an arm 368 on the register carriage shift control shaft 354 (FIG. 16) so that the latch 370 is actuated to release the actuator 371 after entry of a number of digits equal to the capacity of the register gear bank 351. The overcapacity signal blocks any further input to the device until the gear bank 351 has been cleared and returned to its home position. The overcapacity switch 372 is reset during the main shaft cycle by the reset arm 620 which acts upon the tab 371*a* to reset the overcapacity switch actuating arm 371.

The strobe switch 614 is actuated upon the depression of any one of the keys on the keyboard by the strobe bail 212 to supply power to the decoding magnets 301 and to the decoder shaft clutch actuating magnet 115 to initiate a decoder shaft cycle. When the strobe bail 212 moves downward as a key is depressed, it rocks the strobe latch 610 counterclockwise permitting the actuating arm 607 to rotate clockwise under the influence of the spring 627 and actuate the strobe switch 614. The cam follower 628 formed integrally with the actuating arm 607 is free to move backward at this time because the strobe cam 602 is in the position shown. After the decoder shaft has begun rotation and after the input shaft 320 has completed its rightward movement, the strobe cam 602 acts on the cam follower 628 to reset the strobe switch 614 thereby deactuating the decoding electromagnets 301 and the clutch control electromagnet 115.

It may happen that a key is depressed to enter a digit and is left depressed longer than the time required for a decoder cycle. It is necessary when this happens to prevent an unintentional double entry of that digit through recycling of the decoder shaft. Double entry is prevented by a keeper 629 mounted integrally with and biased counterclockwise with respect to the latch 610 by a spring 630. In the rest position of the decoder shaft, the keeper 629 extends downwardly beyond the top of the latching stud 607*a*. Upon depression of the strobe bail 212, the stud slips out of its retaining notch in the latch 610 and the actuator 607 actuates the strobe switch 614, the stud 607*a* meanwhile remaining between the latch 610 and the keeper 629. As the decoder shaft rotates, the cam 602 resets the actuator 607 lowering the latching stud 607*a* beneath the keeper 629. The keeper thereby prevents subsequent reactuation of the strobe switch 614 when the decoder shaft 307 returns to its rest position even though the strobe bail 212 remains depressed; the key controlling the entry must be released and redepressed to initiate a new decoder cycle. For this reason, the strobe latch 610 and the identical function switch latch 611 are referred to as single cycle latches.

The function switch 615 effectively produces a fifth binary code bit which indicates when the remaining four bits characterize a function symbol (i.e., one entered via the function keyboard 102) as opposed to a numeral symbol (i.e., one entered via the numerical keyboard 101). The function bail 222 is actuated by each of the function keys and is controlled and reset through the single cycle latch 611. Downward movement of the function bail 222 rotates the single cycle latch 611 counterclockwise releasing the actuator 608 which actuates the function switch 615. In the case of the single cycle latch 611, the term "single cycle" refers to a main shaft cycle rather than a decoder cycle because the function switch 615 is reset by the reset arm 621 during each main shaft cycle (thereby also resetting the main shaft cycle switch by virtue of the cooperating tabs 618 and 619.

Note that because of the arrangement of tabs 618 and 619, the main shaft cycle switch actuating arm 609 cannot actuate the corresponding main shaft cycle switch 616 until the function switch 615 has been actuated. Otherwise, as will become apparent, entry of each digit would cause the main shaft to cycle rather than just the entry of a function symbol as is desired. Assuming that the function switch 615 has been actuated and has initiated a decoder shaft cycle, near the end of that cycle the main shaft cycle actuating cam 601 causes the main shaft cycle latch 612, normally biased clockwise by the spring 631, to rotate counterclockwise and thereby release the actuating arm 609, which actuates the main shaft cycle switch 616. The switch 616 energizes the main shaft clutch control electromagnet 114 and thereby initiates a main shaft cycle. Approximately two-thirds of the way through the main shaft cycle the single-lobe cam 622 resets both the function switch actuating arm 608 and the main shaft cycle switch actuating arm 609 under the action of reset arm 621.

Figure 33:
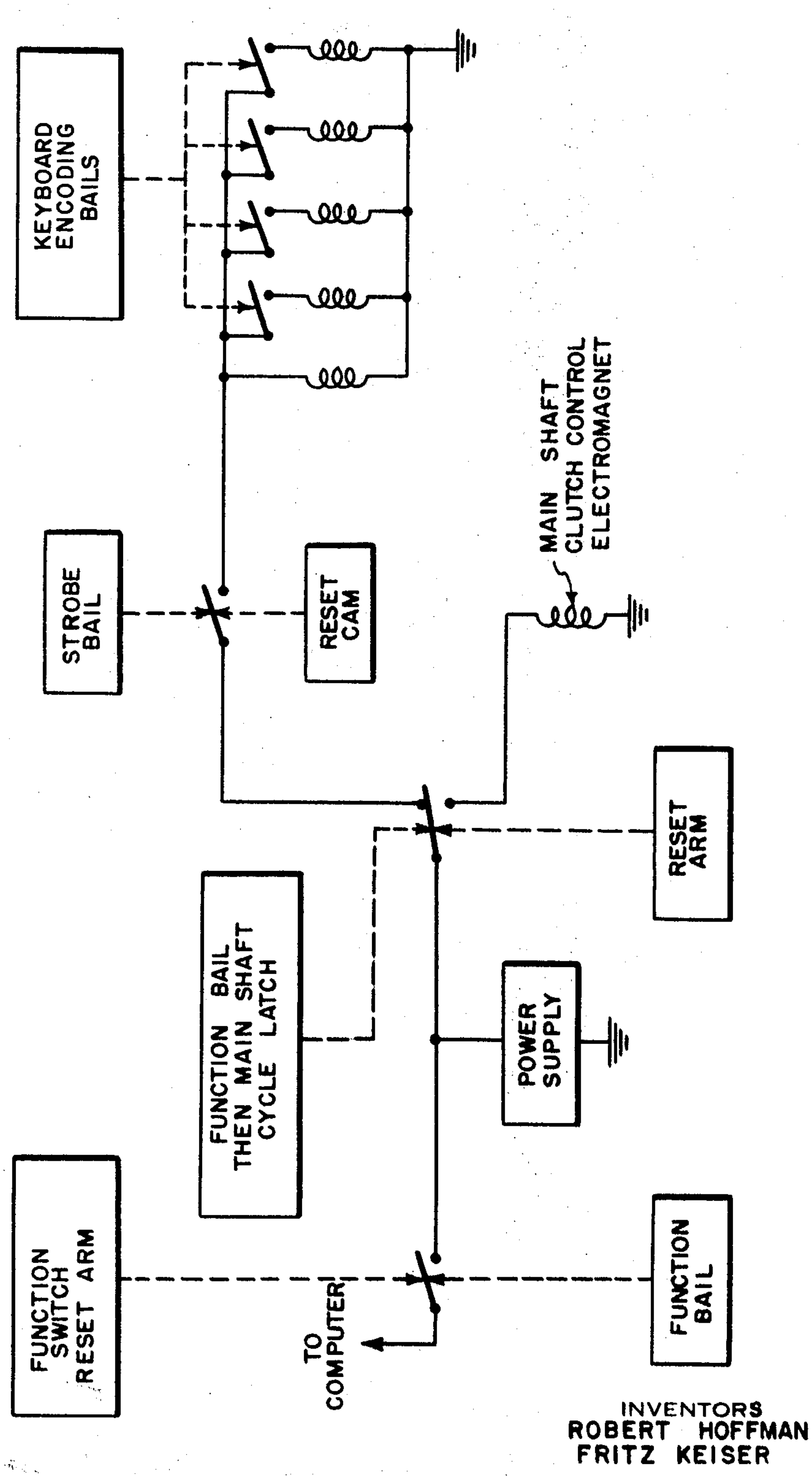
FIG. 33 is a circuit schematic showing how certain control functions are actuated.

The main shaft cycle latch is thus operated during every decoder cycle by the cam 601 but the main shaft cycle switch 616 is actuated only during a decoder cycle initiated by a function key (as opposed to a numeral key). This operation is illustrated by the schematic diagram of FIG. 33 which also illustrates the operation of the decoder electromagnets 301. Depression of a function key operates the strobe switch 614 and the function switch 615 initiating a decoder shaft cycle. Then operation by the cam 601 of the main shaft cycle latch 612 actuates the main shaft cycle switch 616 connected in series with the strobe switch 614 to initiate the main shaft cycle and disconnect the decoder shaft clutch control electromagnet and the decoder electromagnets.

The above-described timing and control generation are exemplary of what may be needed in general for communication between the electrical mechanical data processing terminal and a data processer or the like. It will be apparent to those skilled in the art that the principles embodied therein are applicable to the provision of different timing signals and different interlocks and controls corresponding to any particular application and compatible with particular types of computing or data processing units.

It will be apparent that the invention is not limited to the specific features in the above-described preferred embodiments and that various modifications may be made without departing from its scope as defined in the claims.

We claim:

1. A decoding device capable of receiving electrical signals in a predetermined code form and converting said signals to a mechanical output corresponding to said signals, said device comprising:

a. a bank of coded mechanical elements spaced apart and mounted on a rotatable shaft, each of said mechanical elements having one or more actuators, and each of said actuators being positioned on its respective coded mechanical element at a predetermined angular relation with respect to a fixed plane that includes the rotational axis of the shaft, b. a power source connected to drive the rotatable shaft cyclically, in each of the cycles, which represents one decoding operation, the rotatable shaft being driven through a predetermined angular rotation with respect to the fixed plane, c. a number of converter elements, equal to the number of coded mechanical elements, spaced apart and mounted on a second rotatable shaft, each of the converter elements being reciprocable with respect to the coded mechanical elements between an active and an inactive position, in the active position the converter element being driven by the corresponding mechanical element through an angle depending on the number of angularly positioned actuators on the rotating mechanical element, d. a set of signal-responsive elements capable of receiving electrical signals in said predetermined code form to position one or more of said converter elements in the active positions according to the received electrical signals, and e. a decoder entry gear rotatable by said second shaft through a total angular displacement equivalent to the combined angular rotations of the converter elements, said total angular displacement representing the output information corresponding to the electrical signals.

2. A decoding device according to claim 1 wherein said output information is stored in a register which comprises:

a. a frame, b. a carriage laterally shiftable on said frame, c. an ordinal series of storage gears mounted on and rotatable about a first shaft of said carriage, and d. shift means for stepwise shifting the carriage to bring said storage gears successively into an actuating station to be driven by said decoder entry gear for a fixed amount of angular rotation about said first shaft corresponding to the rotation of the decoder entry gear.

3. A decoding device according to claim 1 wherein:

a. the bank of coded mechanical elements is in the form of decoder wheels, each having one or more gear teeth dependent on a binary code represented by said decoder wheel and said gear teeth being positioned thereon according to predetermined angular relationships with respect to a fixed plane which includes the axis of the rotation of said rotatable shaft, and b. the converter elements are in the form of gears, each of the converter gears, in the active position, being driven by one or more gear teeth of the decoder wheel in each decoding operation thereby rotating said rotatable shaft about the central axis thereof for an angular displacement represented by the decoder wheel.

4. A decoding device according to claim 3 wherein:

a. the bank of decoder wheels having a number of gear teeth corresponding to one of the natural binary codes, each gear tooth being positioned on its respective decoder wheel according to predetermined angular relationship with respect to a fixed plane which includes the rotational axis of said rotating shaft so that the gear tooth for the decoder wheel having a less number of gear teeth precedes the gear teeth of the decoder wheel having more gear teeth in the direction of rotation, b. each of said converter gears spaced apart and mounted on a rotatable shaft, each of the converter gears being reciprocable between an active and an inactive position, in the active position, the gear teeth of the converter gear being in position to be driven by the gear teeth of the decoder wheel as the latter passes through a decoding station and thus rotates the converter gear for a fixed angular displacement representing the number of gear teeth of the decoder wheels passing through said stations, and c. said signal responsive elements are four electromagnets connected to receive the binary coded electrical signals and responsive to the signals for moving a corresponding actuator which controls one of the converter gears thereby reciprocating said converter gear from the inactive position to the active position depending on said signals.

5. A decoding device according to claim 4 wherein:

a. the converter gears are slidably mounted on the rotatable shaft and are maintained at fixed positions thereon by spring bias means, said rotatable shaft being laterally reciprocable for moving the converter gears from the inactive to the active position, b. said decoding device includes cam means connected to and for laterally reciprocating said rotatable shaft in each decoding operation in which the selected converter gears are moved to the active positions as the gear teeth of the decoder wheels pass through the decoding section, and c. the actuators of the electromagnets are in the form of a lever arm pivoted about an axis from a first position to a second position upon energizing the controlling electromagnet, in said first position, one end of the lever arm engaging a shoulder of the converter gear thereby preventing its lateral movement to the active position.

6. A decoding device according to claim 5 wherein said device includes a register which comprises:

a. a frame, b. a carriage laterally shiftable on said frame, c. an ordinal series of decimal digital storage gears mounted on and rotatable about a shaft of said carriage, and d. shift means for stepwise shifting the carriage to bring said digital storage gears successively into position to be driven by said decoder entry gear for a fixed amount of angular rotation about the axis of said shaft in the carriage corresponding to the rotation of the decoder entry gear representing the decimal digital output information.

7. A decoding device according to claim 1 wherein the device includes a register which comprises:

a. a frame having two parallel shafts, b. a carriage shiftably mounted on said frame, c. an ordinal series of storage gears being rotatable about a first shaft in said carriage, and d. shift means for stepwise shifting the carriage to bring said storage gears successively into an actuating position to receive one unit of the set of output information of said decoding elements.

8. A decoding device according to claim 7 wherein:

I. the shiftable carriage comprises:

a. a sleeve slidably mounted on said first shaft carrying said storage gears for rotation about said first shaft, b. an arm connected to the sleeve and extending away therefrom, and c. a bias element for maintaining substantially a constant tension on the sleeve urging said sleeve to move laterally in the direction toward said actuating position to receive the unit of output information, and II. the shift means for stepwise shifting said carriage comprises:
d. a movable element having thereon a plurality of stop elements proportionally spaced along said movable element corresponding to the distance between the storage gears,
e. each of said stop elements having a shoulder portion for engaging said arm in the carriage to prevent the lateral movement of the carriage toward the actuating station, and
f. means for moving the movable element to disengage the arm from the shoulder of the stop element thereby allowing the carriage to move laterally and to engage the shoulder of a successive stop element with the arm thereby preventing further movement of the carriage.

9. A decoding device according to claim 8 wherein the movable element is a periodically rotating shaft and said stop elements thereon are equally spaced along a helical path on the periphery of the shaft, the periodical rotational movement of the shaft successively disengaging and engaging the arm from the shoulders of the stop elements, thereby providing a stepwise movement for the carriage.

10. A decoding device according to claim 1 which includes a register comprising:
I. a frame having thereon a first and a second parallel shaft,
II. a shiftable carriage on said frame comprising:
a. a sleeve slidably mounted on said first shaft,
b. an arm connected to the sleeve and extending away therefrom, said arm having a stop surface thereon, and
c. a bias element for maintaining a substantially constant pressure on the sleeve urging said sleeve to move laterally in the direction toward an actuating station,
III. an ordinal series of storage gears serving as the storage element and being mounted on said sleeve and rotatable about the first shaft, the storage gears capable of being driven successively by the decoder entry gear at the actuating station, and
IV. shift means for stepwise shifting said carriage to bring the ordinal series of storage gears into said actuating position, said shift means comprising:
d. a movable element having thereon a plurality of stop elements spaced along said movable element at distances between the stop elements proportionally corresponding to the distances between the storage gears,
e. each of said stop elements having a shoulder portion for engaging the cam surface of the arm to prevent the lateral movement of the carriage urged by the bias element, and
f. means for moving the movable element successively to disengage the arm from the shoulder of one of said stop elements to allow lateral movement of said carriage until the arm engages the shoulder of a succeeding stop element.

11. A decoding device according to claim 1 which includes a register comprising:
I. a frame having thereon a first and a second parallel shaft,
II. a carriage shiftable on said frame comprising:
a. a sleeve slidably mounted on said first shaft,
b. an arm connected to the sleeve and extending away therefrom, said arm having a stop surface thereon, and
c. a bias element for maintaining a substantially constant pressure on the sleeve urging said sleeve to move laterally in the direction toward an actuating station,
III. an ordinal series of storage gears serving as the storage element and being mounted on said sleeve and rotatable about the first shaft, the storage gears capable of being driven successively by the decoder entry gear at the actuating station, and
IV. shift means for stepwise shifting said carriage to bring the ordinal series of storage gears into said actuating station, said shaft means comprising:
d. a rotating shaft having thereon a plurality of stop elements equally spaced along a helical path on the periphery of the shaft, the lateral distances between the stop elements proportionally corresponding to the lateral distances between the storage gears,
e. each of said stop elements having a shoulder portion for engaging the stop surface of the arm to prevent the lateral movement of the carriage urged by the bias element, and
f. gear means for rotating said shaft a predetermined angle subsequent to each decoding operation moving said stop element away from the stop surface of the arm thereby allowing the bias carriage to move laterally until the stop surface engages the shoulder of a succeeding stop element in the path thereof.

12. A decoding device according to claim 11 wherein the bias element for maintaining a substantially constant pressure on the carriage comprises a spring element one end of which attaches to the arm connected to the sleeve and the other end attaches to a first end of a flexible elongated member, the second end of said flexible elongated member being wound on a stepwise rotating drum and gear means for successively rotating said drum for a predetermined angle sufficient to wind, substantially simultaneously as the carriage is stepwise shifted, the required amount of said flexible elongated member due to the lateral movement of said carriage.

13. A decoding and printout device for use in combination with data processing equipment which device comprises:
I. a decoding section operable upon receiving electrical signals initiated from said data processing equipment, said decoding section comprising:
a. a bank of decoder wheels spaced apart and mounted on a first rotatable shaft, each of said decoder wheels having one or more gear teeth depending on the binary code represented by said decoder wheel and being positioned thereon according to predetermined angular relationship with respect to a fixed plane which includes the axis of the rotation of said rotating shaft,
b. a first drive means connected to drive the rotating shaft cyclically,
c. a number of converter gears, equal to the number of decoder wheels, spaced apart and mounted on a second rotatable shaft, each of the converter gears being reciprocable relatively with respect to a corresponding decoder wheel between an active and an inactive position, and in the active position the converter gear being driven by one or more gear teeth of the decoder wheel in each cycle representing one decoding operation thereby rotating said rotatable shaft about the central axis thereof for an angular displacement represented by the decoder wheel,
d. a set of signal responsive elements connected to receive said binary coded signals, each having an actuator for controlling one of the converter gears to reciprocate from the inactive position to the active position depending on said signals, and
e. a decoder entry gear rotatable by said second rotatable shaft to a total angular displacement equal to a combined angular displacements of the converter gears, said total angular displacement representing the output information corresponding to the binary coded electrical signals;
II. a register for receiving the output information; and
III. a printout section comprising means for printing the information in the register.

14. A decoding and printout device according to claim 13 wherein the register comprises:
a. a frame,
b. a carriage laterally shiftable on said frame,
c. an ordinal series of decimal digital storage gears mounted on and rotatable about a shaft of said carriage, and
d. shift means for stepwise shifting the carriage to bring said digital storage gears successively into position to be driven by said decoder entry gear for a fixed amount of angular rotation about the axis of said shaft in the carriage corresponding to the rotation of the decoder entry gear representing the decimal digital output information.

15. A device according to claim 14 wherein:

I. the shiftable carriage comprises:

a. a sleeve slidably mounted on said first shaft carrying said storage gears for rotation about said first shaft, b. an arm connected to the sleeve and extending away therefrom, and c. a bias element for maintaining substantially a constant tension on the sleeve urging said sleeve to move laterally in the direction toward said actuating position to receive the unit of output information; and II. the shift means for stepwise shifting said carriage comprises:

d. a movable element having thereon a plurality of stop elements proportionally spaced along said movable element corresponding to the distance between the storage gears, e. each of said stop elements having a shoulder portion for engaging said arm in the carriage to prevent the lateral movement of the carriage toward the actuating station, and f. means for moving the movable element to disengage the arm from the shoulder of the stop element thereby allowing the carriage to move laterally and to engage the shoulder of a successive stop element with the arm thereby preventing further movement of the carriage.

16. A decoding and printout device according to claim 14 wherein:

a. the converter gears are slidably mounted on the rotatable shaft and are maintained at fixed positions thereon by spring bias means, said rotatable shaft being laterally reciprocatable for moving the converter gears from the inactive to the active position, b. there are cam means connected to and for laterally reciprocating said rotatable shaft in each decoding operation in which the selected converter gears are moved to the active positions as the gear teeth of the decoder wheels pass through the decoding section, and c. the actuators of the signal responsive elements are in the form of a lever arm pivoted about an axis from a first position to a second position upon energizing the controlling signal responsive elements, in said first position, one end of the lever arm engaging a shoulder of the converter gear thereby preventing its lateral movement to the active position.

17. A decoding and printout device according to claim 13 wherein the register of the decoding section comprises:

a. a frame movable between an input and an output position, b. a shiftable carriage laterally slidable on a first shaft of said frame, c. an ordinal series of decimal digital storage gears serving as the storage elements and mounted on the carriage and rotatable about said first shaft, each of said gears having a home position, d. shift means actuable when said frame is in the input position for stepwise shifting the carriage to bring said digital storage gears successively into position to be driven by said decoder entry gear for a fixed amount of angular rotation about the axis of said shaft in the carriage corresponding to the rotation of the decoder entry gear representing the decimal digital output information.

18. A decoding and printout device according to claim 17 wherein:

I. the shiftable carriage comprises:

a. a sleeve slidably mounted on said first shaft carrying said storage gears for rotation about said first shaft, b. a first arm connected to the sleeve and extending away therefrom, and having a stop surface thereon, c. a bias element for maintaining substantially a constant tension on the sleeve urging said sleeve to move laterally in the direction toward said actuating position to receive the unit of output information, and II. the shift means for stepwise shifting said carriage comprises:

d. a periodically rotating shaft having thereon a plurality of stop elements proportionally spaced along a helical path on the periphery of the shaft corresponding to the distance between the storage gears, e. each of said stop elements having a shoulder portion for engaging the stop surface of said first arm in the carriage to prevent the lateral movement of the carriage toward the actuating station, and f. means for providing a rotational movement to said shaft after each entry to the storage gear to disengage the stop surface of said first arm from the shoulder of the stop element thereby allowing the carriage to move laterally and to engage the shoulder of a successive stop element with the arm thereby preventing further movement of the carriage.

19. A decoding printout device according to claim 13 wherein the printout section comprises:

a. a set of printing elements each corresponding to and capable of receiving the information in one of said storage elements of said register, b. a transfer mechanism, actuable after the storage elements have completed the receipt of the set of output information from the decoding elements, for transferring simultaneously the contents of the register to the corresponding printing elements thereby selecting the printing elements corresponding to the set of output information for a printing operation, c. a record material disposed in printing relationship with the printing elements, and d. a printing actuator movably mounted in spaced relationship with the printing elements to provide pressure on selected areas of the record material in printing engagement with the printing elements thereby printing the information therein onto said material.

20. A decoding printout device according to claim 19 wherein the register of the decoding section comprises:

I. a frame having thereon a first and a second parallel shaft and being movable between an input and an output position;

II. a shiftable carriage on said frame comprising:

a. a sleeve slidably mounted on said first shaft, b. a first and a second arm connected to the sleeve and extending oppositely away therefrom, said first and second arms having a stop surface and a cam follower thereon, respectively, and c. a bias element for maintaining a substantially constant pressure on the sleeve urging said sleeve to move laterally in the direction toward an actuating station, III. an ordinal series of storage gears serving as the storage elements and being mounted on said sleeve and rotatable about the first shaft, when the frame of the register is at the input position, the storage gears capable of being driven successively by the decoder entry gear at the actuating station in an ordinal sequence from a home position thereof, and IV. shift means for stepwise shifting said carriage when said frame is at the input position to bring the ordinal series of storage gears successively into said actuating position, said shift means comprising:

d. a periodically rotating shaft having thereon a plurality of stop elements spaced along a helical path on the periphery of said shaft at distances between the stop elements proportionally corresponding to the distances between the storage gears, e. each of said stop elements having a shoulder portion for engaging the stop surface of the first arm to prevent the lateral movement of the carriage urged by the bias element, f. means for rotating said shaft after each entry of the storage gears to disengage the stop surface of said first arm from the shoulder of one of said stop elements to allow lateral movement of said carriage until the arm engages the shoulder of a succeeding stop element, and g. carriage return means for returning said carriage to its home position which comprises an elongated helical cam rotatable about an axis and in engagement with said cam follower on the second arm upon the return of the frame to its input position, and a second drive means for rotating said helical cam after the contents of the storage gears have been transferred to the printing elements.

21. A decoding and printout device according to claim 20 wherein:

I. the set of printing elements in the printout section are rotatably mounted on a shaft, each printing element having a plurality of print facets representing the information in the first code form, each facet capable of being rotated to a printing position for each printing operation, and II. the transfer mechanism comprises:

a. a power source, b. a bank of reset gears connected to and cyclically driven by said power source, c. a cam follower mounted on the frame of said register, d. a periodically rotating cam surface in rotational engagement with said cam follower, after the storage gears in the register have completed the receipt of the set of output information from the decoding elements, for moving said frame from the input to the output position causing the storage gears to come in driving relationship with the printing elements and in driven relationship with the bank of reset gears, thereby upon rotating of said reset gears, transferring simultaneously the contents of the register to the printing elements, and e. a third drive means for periodically rotating said cam surface.

22. A decoding and printout device according to claim 21 wherein the printing elements are reset to their home positions where the print facets in the printing positions are a blank after each printing operation by a reset mechanism, which comprises a bank of idler gears each of which is in driving relationship with one of the rotatably mounted printing elements and in driven relationship with one of a bank of printing element reset gears and has a home position corresponding to the home position of its driven printing element, and a fourth drive means for rotating said printing element reset gears after each printing operation to rotate the idler gears to their respective home positions thereby resetting said printing elements.

23. A decoding and printout device according to claim 19 wherein the decoding and printout sections are controlled and motivated by a set of gear trains arranged for providing selectively driving forces to the decoding and printing operations according to a predetermined time sequence whereby the decoding operation can be carried out concurrently with the printing of the preceding decoded information in the printing elements.

24. A decoding device capable of receiving electrical signals in a predetermined code form and converting said signals to a mechanical output corresponding to said signals, said device comprising:

a. a bank of coded mechanical elements spaced apart, each of said mechanical elements having one or more actuators, and each of said actuators being located on its respective coded mechanical element at a predetermined position, b. a power source connected to drive the bank of mechanical elements cyclically, in each of the cycles, which represents one decoding operation, the mechanical elements being moved through a predetermined distance, c. a number of converter elements, equal to the number of coded mechanical elements, each of which is reciprocable with respect to the coded mechanical elements between an active and an inactive position, in the active position the converter element being driven by the corresponding mechanical element through a distance depending on the number of actuators on the mechanical element, d. a set of signal-responsive elements capable of receiving electrical signals in said predetermined code form to position one or more of said converter elements in the active positions according to the received electrical signals, and e. a decoder entry element movable by said converter elements through a total distance equivalent to the combined distances of the converter elements, said total distance representing the output information corresponding to the electrical signals.